(12) United States Patent
Richmond

(10) Patent No.: US 8,077,052 B2
(45) Date of Patent: Dec. 13, 2011

(54) ILLUMINATED WIND INDICATOR

(76) Inventor: Simon Nicholas Richmond, Princeton, NJ (US)

( * ) Notice: Subject to any disclaimer, the term of this patent is extended or adjusted under 35 U.S.C. 154(b) by 632 days.

(21) Appl. No.: 11/968,504

(22) Filed: Jan. 2, 2008

(65) Prior Publication Data

US 2009/0207596 A1 Aug. 20, 2009

Related U.S. Application Data

(63) Continuation-in-part of application No. 11/303,247, filed on Dec. 16, 2005, now Pat. No. 7,336,157.

(60) Provisional application No. 60/642,382, filed on Jan. 7, 2005.

(51) Int. Cl.
*G08B 5/00* (2006.01)
*F21L 19/00* (2006.01)

(52) U.S. Cl. ..................... 340/815.4; 362/159
(58) Field of Classification Search ...... 290/1; 362/159; 340/601
See application file for complete search history.

(56) References Cited

U.S. PATENT DOCUMENTS

| | | | |
|---|---|---|---|
| 1,407,534 A | 2/1922 | Hering | |
| 1,637,963 A | 8/1927 | Sauvage | |
| 2,372,071 A | 3/1945 | Fernberger | |
| 2,463,182 A | 3/1949 | Ketay, M | |
| 2,979,467 A | 4/1961 | Keller | |
| 4,281,369 A * | 7/1981 | Batte | 362/183 |
| 4,387,999 A | 6/1983 | Shelley | |
| 4,588,618 A * | 5/1986 | Wolfe | 428/7 |
| 4,702,140 A | 10/1987 | Goldfarb | |
| 4,854,214 A * | 8/1989 | Lowe | 84/404 |
| 4,857,228 A | 8/1989 | Kabay | |
| 4,978,948 A | 12/1990 | Samen | |
| 5,043,096 A | 8/1991 | Lindmayer | |
| 5,065,291 A * | 11/1991 | Frost et al. | 362/183 |
| 5,208,578 A | 5/1993 | Tury et al. | |
| 5,369,391 A * | 11/1994 | Gadsby | 340/392.5 |
| 5,376,303 A | 12/1994 | Royce et al. | |
| 5,402,700 A * | 4/1995 | Cohen | 84/404 |
| 5,424,006 A | 6/1995 | Murayama et al. | |
| 5,452,638 A * | 9/1995 | Yancy | 84/404 |

(Continued)

FOREIGN PATENT DOCUMENTS

CN 2745165 Y 12/2005

(Continued)

OTHER PUBLICATIONS

Bibliographic data for CN2852317 filed Oct. 31, 2005 with English Text of Abstract from http://depatisnet.dpma.de/DepatisNet/depatisnet?action=bibdat&docid=CN000002852317Y.

(Continued)

*Primary Examiner* — Benjamin C Lee
*Assistant Examiner* — Sigmund Tang
(74) *Attorney, Agent, or Firm* — Volpe and Koenig, P.C.

(57) ABSTRACT

An illuminated wind indicator that provides visual indication of wind motion even at night. One or more chime members and a pendulum assembly are suspended from a support of housing, and arranged so that the chime members and the pendulum assembly may more relative to each other. In addition, a light source is situated such that a portion of the pendulum emits light. The light source is powered by a solar cell and a rechargeable battery. A light source may be used to detect ambient light and switch the battery from accumulating charge to powering the light source. The light source may include a luminescent material.

9 Claims, 16 Drawing Sheets

U.S. PATENT DOCUMENTS

| | | | |
|---|---|---|---|
| 5,472,737 A | 12/1995 | Anders | |
| 5,587,697 A | 12/1996 | Rent | |
| 5,647,298 A * | 7/1997 | Yancy | 119/57.8 |
| 5,772,314 A * | 6/1998 | Brumer | 362/360 |
| 5,831,516 A | 11/1998 | Jennings | |
| 5,980,056 A | 11/1999 | West | |
| 6,124,782 A | 9/2000 | Kraft, Sr. | |
| 6,166,660 A | 12/2000 | Greiner | |
| 6,288,633 B1 | 9/2001 | Volpe et al. | |
| 6,441,284 B1 | 8/2002 | Greene | |
| 6,491,516 B1 | 12/2002 | Tal et al. | |
| 6,604,691 B1 | 8/2003 | Thomas et al. | |
| 7,126,450 B2 | 10/2006 | Baarman et al. | |
| 7,336,157 B2 * | 2/2008 | Richmond | 340/326 |
| 7,345,371 B1 * | 3/2008 | Kuelbs | 290/1 R |
| 2002/0180404 A1 | 12/2002 | Benn et al. | |
| 2003/0092352 A1 | 5/2003 | Collier | |
| 2005/0040785 A1 | 2/2005 | Barnes et al. | |
| 2005/0135101 A1 | 6/2005 | Richmond | |
| 2005/0248285 A1 | 11/2005 | Richmond | |
| 2005/0279403 A1 * | 12/2005 | Kube | 136/291 |
| 2007/0019404 A1 | 1/2007 | Chen | |
| 2007/0175315 A1 | 8/2007 | Maeng | |
| 2008/0158866 A1 | 7/2008 | Fan | |
| 2008/1029166 | 11/2008 | Wijaya et al. | |

FOREIGN PATENT DOCUMENTS

| | | | |
|---|---|---|---|
| CN | 2852317 Y | | 12/2006 |
| CN | 2862252 Y | | 1/2007 |
| GB | 2 186 108 | * | 5/1987 |
| GB | 2186108 A | | 8/1987 |
| JP | 03139698 A | | 6/1991 |

OTHER PUBLICATIONS

Bibliographic data for CN2745165Y filed Oct. 10, 2004 with English Text of Abstract from http://depatisnet.dpma.de/DepatisNet/depatisnet?action=bibdat&docid=CN000002745165Y.

Bibliographic data for CN2862252Y filed Aug. 9, 2005 with English Text of Abstract from http://depatisnet.dpma.de/DepatisNet/depatisnet?action=bibdat&docid=CN000002862252Y.

* cited by examiner

ILLUMINATED WIND INDICATOR

CROSS REFERENCE TO RELATED APPLICATIONS

This application is a continuation-in-part of U.S. patent application Ser. No. 11/303,247, now U.S. Pat. No. 7,336,157, filed on Dec. 16, 2005 by S. Richmond entitled "Illuminated Wind Indicator", which is related to, and claims priority from, U.S. Provisional Patent application No. 60/642,382 filed on Jan. 7, 2005 by S. Richmond entitled "Wind Chime", the contents of both of which patent applications are hereby incorporated by reference;
this application is a continuation-in-part of U.S. patent application Ser. No. 11/755,917, now U.S. Pat. No. 7,448,347, filed on May 31, 2007, which claims the benefit of U.S. Provisional Patent application 60/811,137 filed on Jun. 5, 2006 and is a continuation-in-part of U.S. patent application Ser. No. 11/303,247, now U.S. Pat. No. 7,336,157, filed on Dec. 16, 2005, and is a continuation-in-part of U.S. patent application Ser. No. 11/420,160, now U.S. Pat. No. 7,708,424, filed on May 24, 2006; and
this application is a continuation-in-part of U.S. patent application Ser. No. 11/420,160, now U.S. Pat. No. 7,708,424, filed on May 24, 2006, which is a continuation-in-part of U.S. patent application Ser. No. 11/303,247 filed on Dec. 16, 2005, which claims the benefit of U.S. Provisional Patent application No. 60/642,382 filed on Jan. 7, 2005.

This application is also related to, U.S. patent application Ser. No. 11/420,160 filed on May 24, 2006, by S. Richmond, entitled "A Solar Powered Fluorescent Gazing Globe", the contents of which are hereby incorporated by reference.

This application is also related to, U.S. patent application Ser. No. 11/755,917 filed on May 31, 2007, by S. Richmond, entitled "Illuminated Hummingbird Feeder", the contents of which are hereby incorporated by reference.

FIELD OF THE INVENTION

The present invention relates to a wind indicator, and more particularly to illuminated wind indictors.

BACKGROUND OF THE INVENTION

A common form of domestic wind indictor is the wind chime in which a plurality of chime members and a striker are suspended from a support portion, and arranged so that the striker collides with the chime members when moved by the wind.

Although a wind chime produces a pleasant sound, the visual aesthetic appeal of the wind chime is typically relatively limited. Moreover, at night, a wind chime cannot be heard through a closed window nor can it be seen in the dark, limiting its effectiveness as a wind indicator in such circumstances.

SUMMARY OF THE INVENTION

Briefly described, the present invention relates to an illuminated wind indicator that provides visual indication of wind motion even at night or in the dark.

In a preferred embodiment, the wind indicator has one or more chime members and a pendulum assembly suspended from a support or housing, and arranged so that the chime members and the pendulum assembly are capable of colliding with each other. In addition, there is a light source situated such that a portion of the pendulum assembly emits light.

In a preferred embodiment power for the light source is provided by a solar cell and a rechargeable battery. The solar cell charges the battery when there is sufficient ambient light available, and the accumulated charge is later used to power the light. A light sensor may be used to automatically switch the light on when the ambient light falls below a predetermined level.

In a preferred embodiment, the pendulum assembly has a light transmitting region and the light is situated so that light is emitted via the transmitting region of the pendulum assembly. The light may be a suitable light emitting diode.

In another embodiment of the invention, the pendulum assembly contains the one or more solar panels used to obtain power.

In a further embodiment of the invention, the light source may include a luminescent material. The luminescent material may be a phosphorescent material, which effectively stores light for later emission, or it may be a fluorescent material, or a combination of the two. When the light source is a fluorescent material there may be a further electrically powered light source of the appropriate wavelength to cause fluorescence.

These and other features of the invention will be more fully understood by references to the following drawings.

DETAILED DESCRIPTION

The present invention relates to wind indicators and particularly to illuminated domestic wind indicators.

In a preferred embodiment, the illuminated wind indictor is a modified wind chime having a light emitting pendulum assembly with the light being powered using a rechargeable battery and solar panels. In this manner, power can be accumulated during the day and used to provide illumination at night.

A preferred embodiment of the illuminated window will now be described by reference to the accompanying drawings in which, as far as possible, like numbers represent like elements.

Figure 1:
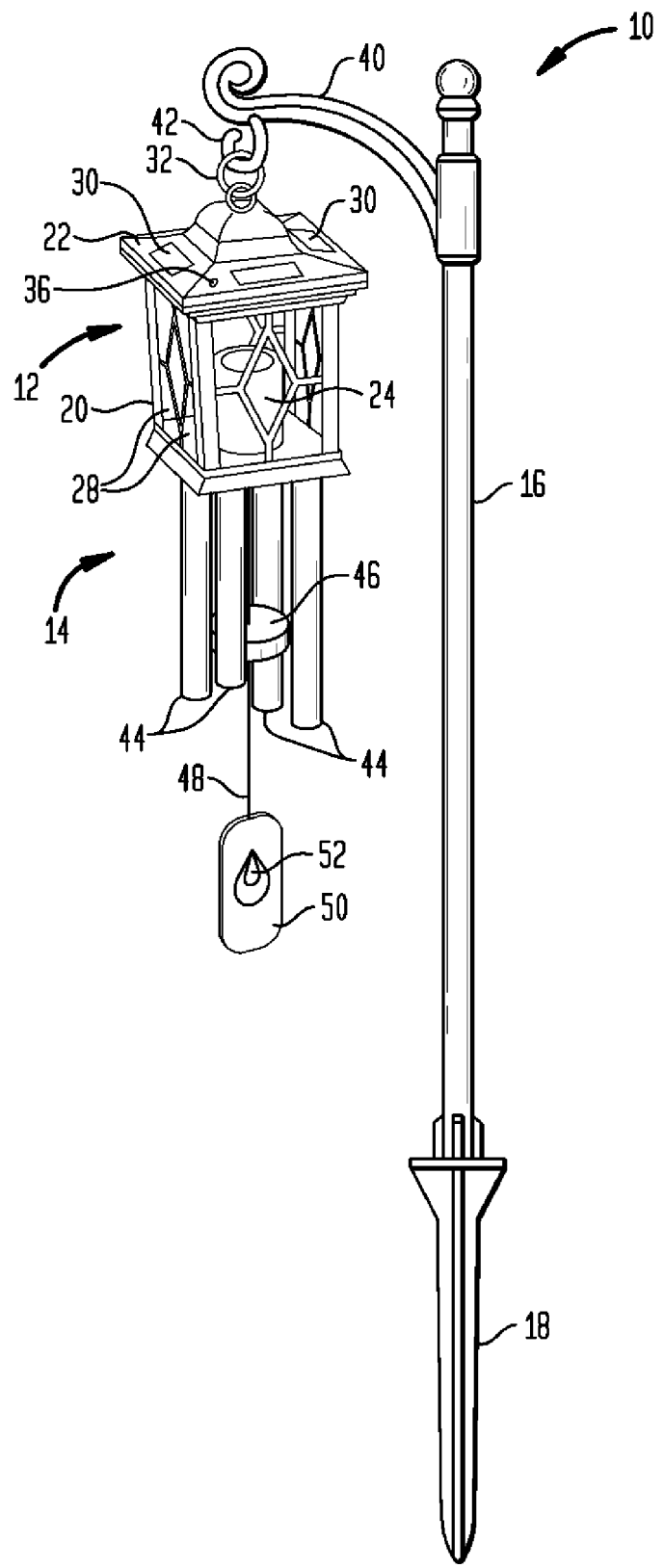
FIG. 1 is a diagrammatic perspective view of a wind indicator in accordance with an embodiment of the present invention.

FIG. 1 is a diagrammatic perspective view of a wind indicator 10 in accordance with a preferred embodiment of the present invention, comprising a light device 12 and a chime portion 14, the light device 12 and the chime portion 14 being suspended on a support 16 provided with a spike 18.

In the embodiment illustrated in FIG. 1, the light device 12 includes a housing portion 20 and a lid portion 22. The light device 12 in this example is of lantern-type appearance.

Disposed inside the housing portion 20 during use is a light source 24 that may be configured so as to resemble the appearance of a candle. The light source 24 may include one or more light emitting elements (LEDs), and the light source 24 may be formed of translucent material so that light passing through the light source 24 during use is diffused.

The housing portion 20 includes a plurality of translucent or transparent panels 28.

The light device 12 also includes a solar power converting means, in this example in the form of solar panels 30, which serves to convert solar power to electrical power. The solar panels 30 may be in the form of encapsulated polycrystalline PV solar panels or any other suitable solar power converting means.

The light device 12 also includes means, in this example in the form of a ring member 32, for facilitating hanging of the wind chime 10 from the support 16. However, it will be understood that any suitable hanging means may be provided.

It will be understood that although the support 16 includes a spike 18 for facilitating mounting of the wind chime 10 relative to a ground portion of a garden, other arrangements for supporting the wind chime 10 from a structure are envisaged.

The support 16 also includes a cross member 40 having a hook 42 disposed at a free end of the cross member 40 for receiving hanging means of a light device 12 such as a ring member 32.

The chime portion 14 includes a plurality of chime members 44 moveably suspended from the housing portion 20, and a pendulum assembly also moveably suspended from the housing portion 20. In this example, the pendulum assembly includes a striker disc 46 suspended using electrical wires 48 which pass from the light device 12 through the striker disc 46 to a pendulum 50 disposed at an end of the electrical wires 48 remote from the light device 12.

The electrical wires 48 may be electrically connected to a second light emitting element, in this example in the form of a second LED 52, the second LED 52 being disposed inside the pendulum 50 and the pendulum 50 being formed of a suitable translucent or transparent material.

During use, electrical power is supplied from the rechargeable batteries 31 to the first and second LEDs 26, 52 so as to cause light to pass through the panels 28 of the housing portion 20 and to be emitted by the pendulum 50.

It will be understood that since light is emitted by the pendulum 50, as the wind impinges on the pendulum and/or the striker 46 during use, the pendulum will be urged to move, thereby causing an aesthetically pleasing light flickering effect.

It will also be understood that since a flickering light effect occurs when wind impinges on the pendulum and/or the striker, a user is provided with a visual indication of the presence of wind. In this way, it is possible for a user to discern that wind is present even if the wind is not strong enough to cause the striker 46 to contact the chime members 44.

It will also be understood that at least part of the light emitted by the pendulum 50 during use will be reflected by one or more of the chime members 44, thereby enhancing the aesthetic appeal of the wind chime 10.

As an alternative, the light source 52 may be disposed elsewhere in the pendulum assembly, such as in the striker 46.

Figure 2:
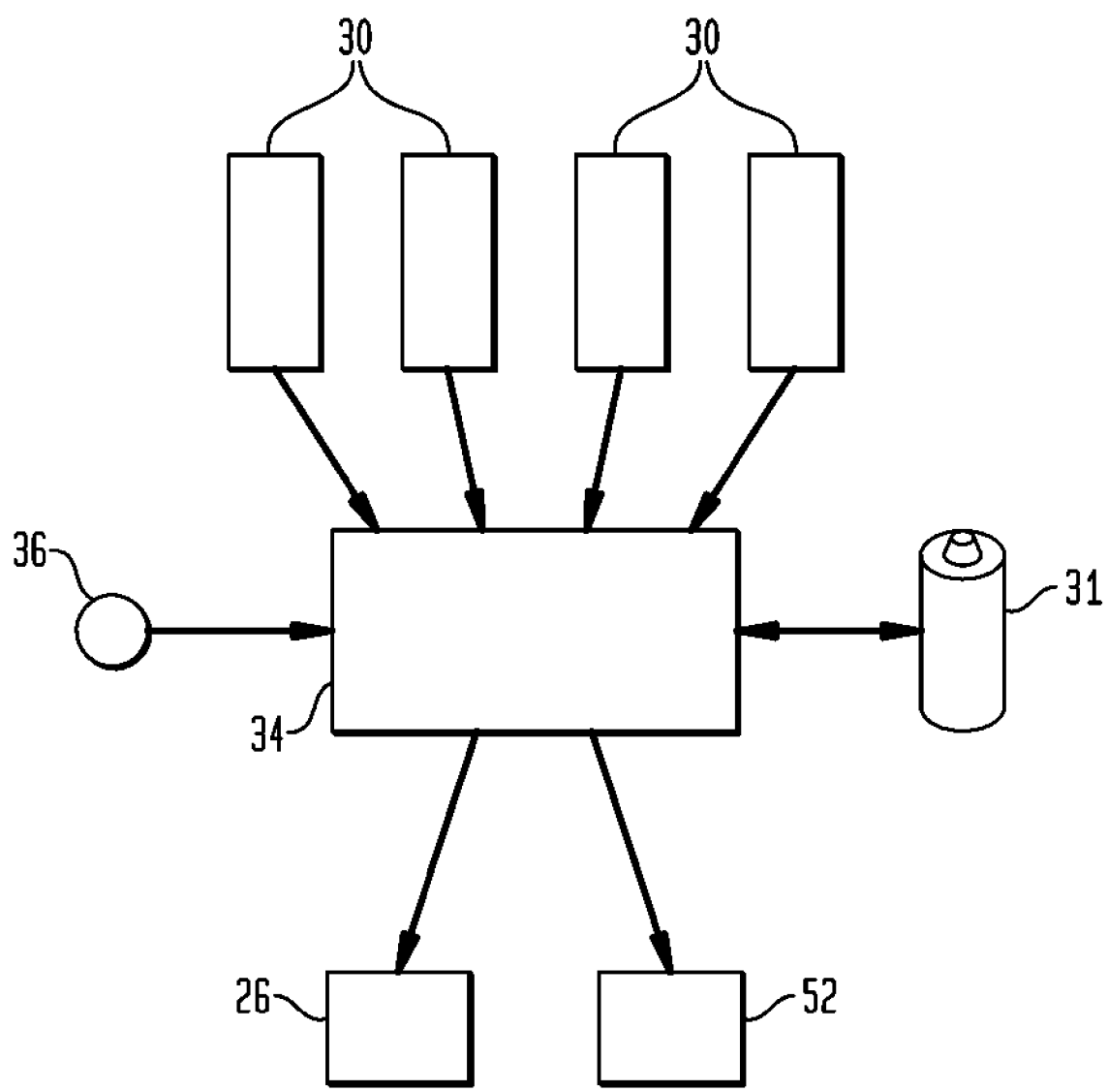
FIG. 2 is a block diagram showing components of the wind indicator shown in FIG. 1.

FIG. 2 is a block diagram showing components of the wind indicator shown in FIG. 1. In particular, electrical power supplied by the solar panels 30 serves to recharge a rechargeable power source, in this example rechargeable batteries 31 which may be, but are not limited to, NiCd batteries.

In order to coordinate supply of electrical power from the solar panels 30 to the rechargeable batteries 31 and from the rechargeable batteries 31 to light emitting elements 26, a control unit 34 is provided.

The control unit 34 may be arranged to sense the ambient light level, for example using a light dependent resistor 36 and, if a determination is made that a the ambient light is below a certain level, the rechargeable battery is then connected so as to power the light source.

The control unit 34 may also be arranged to sense the ambient light level, for example using a light dependent resistor 36 and, if a determination is made that a sufficient ambient light is available for recharging the batteries 31 using the solar panels 30, a connection is made between the solar panels 30 and the batteries 31 and a recharge current flows from the solar panels 30 to the batteries 31. If a determination is made that insufficient ambient light is available, a connection is not made between the solar panels 30 and the batteries 31 and a current does not flow to the batteries. In this way, when the light sensor detects ambient light of predetermined level, the solar panel and rechargeable battery are connected so that the rechargeable battery accumulates a charge. When another predetermined level of ambient light is detected, the rechargeable battery is then connected so as to power the light source.

The light device 12 may also be arranged to receive power directly from an external power source, for example by providing the light device 12 with an appropriate step-down transformer (not shown) connectable to mains AC electrical power, and appropriate AC to DC conversion circuitry. In addition, the light device 12 may be arranged to receive power from an external power source and to use the power to recharge the batteries 31.

In order to cause the LEDs 26 in the light source 24 to flicker, the control unit 34 may be provided with an inverter (not shown) and the inverter controlled so as to generate an alternating current which causes the LEDs 26 to mimic the characteristic flicker of a flame. Alternatively, an irregular oscillating input may be applied to a switching transistor so as to cause irregular switching of current through the LEDs 26. Appropriate biasing signals for the switching transistor may be generated using multiple oscillators, each of which is arranged to oscillate at a different frequency. For example, a base of the switching transistor may be connected to outputs of multiple Schmitt trigger oscillators arranged to oscillate at different frequencies, the Schmitt trigger oscillators for example being constructed using a CMOS40106 Hex inverting Schmitt trigger integrated circuit.

The control unit 34 may be controllable so that the light source 24 is caused to flicker or to not flicker, for example based on the position of a manually operable switch.

The light source may also or instead include a colored light or a light capable of being used to provide varying colors.

Figure 3:
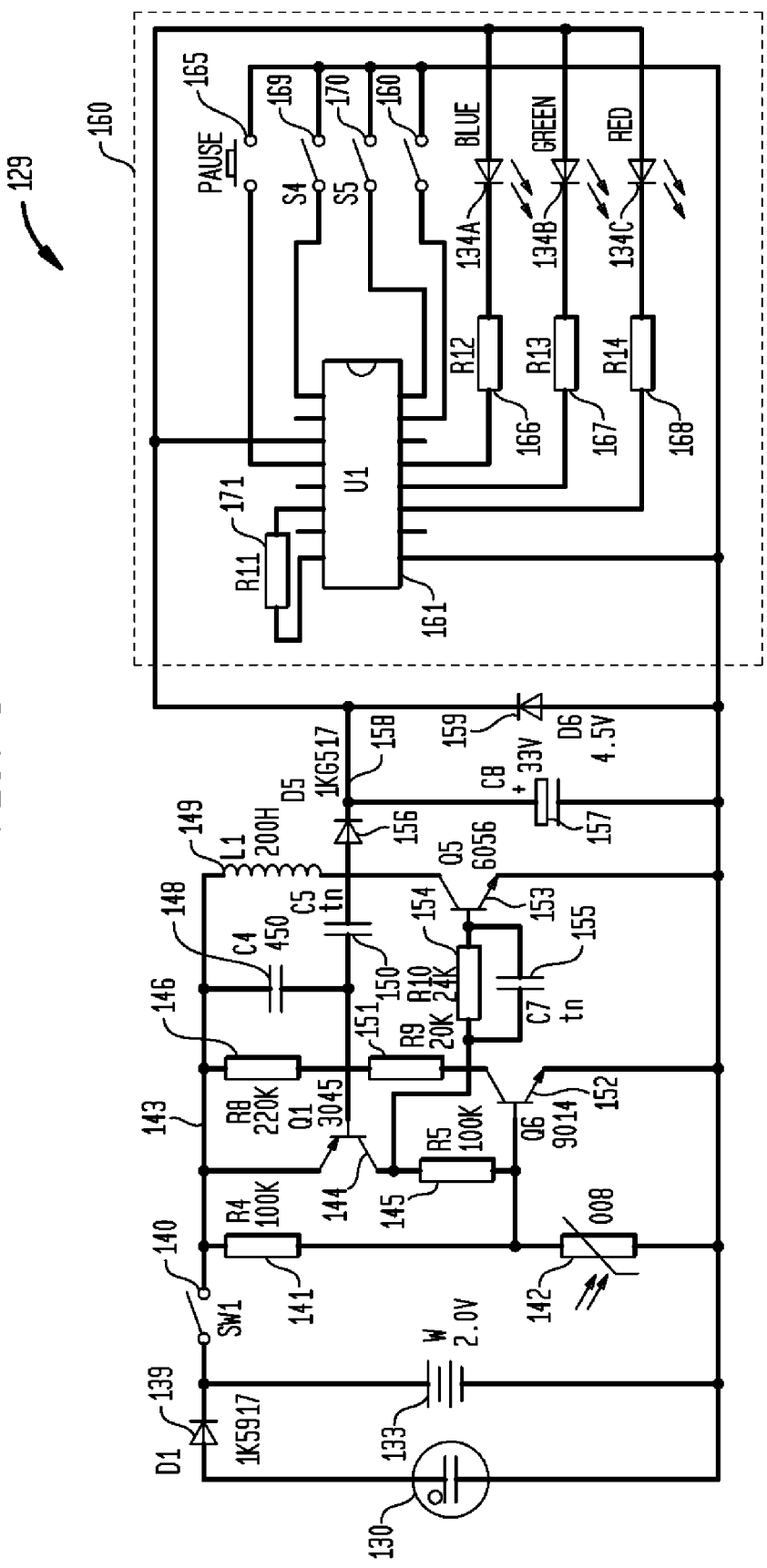
FIG. 3 is circuit diagram showing circuitry for controlling a three color led display.

FIG. 3 is circuit diagram showing circuitry for controlling a three color led display. This circuitry is described in detail in U.S. patent application Ser. No. 10/789,488 of S. Richmond entitled "A solar powered light assembly to produce a light of varying colors" filed on Feb. 6, 2004, and in continuation-in-part U.S. patent application Ser. No. 11/102,229 of S. Richmond entitled "A solar powered light assembly to produce a light of varying colors" filed on Apr. 7, 2005, the contents of both of which are hereby incorporated by reference. The power supply circuit comprises a solar cell 130 connected in series to a forward biased diode 139, which is in turn connected to a positive terminal of a battery 133. A negative terminal of the battery 133 is then connected to the solar cell 130 to complete the power supply circuit. In this example, the diode 139 is a model number IN5817 Schottky diode and the battery comprises two rechargeable 1.2 volt battery cells. It will be apparent to a person skilled in the art that other diode and battery configurations may be utilized without departing from the spirit and scope of the invention.

When the solar cell 130 is exposed to sufficient light, the solar cell converts some of the solar energy to electrical energy and creates a current that passes through the diode 139 to charge the battery 133. Thus, during the day the solar cell 30 converts energy from the sun to charge the battery 133. The diode 139 prevents the battery 133 from expending 130 any power on the solar cell 130.

The power supply circuit is connected in parallel to the light operated circuit, which is connected across the terminals of the battery 133. The positive terminal of the battery 133 is connected to a switch 140, which is in turn connected to a 100 k.OMEGA. first resistor 141. The first resistor 141 is connected in series with a second, light-dependent resistor 142. The second resistor 142 connects to the negative terminal of the batteries 33 to complete the light operated circuit. The value of resistance of the second resistor 142 depends on the amount of light to which the second resistor 142 is exposed. When there is not much light, such as occurs during the night, the value of the second resistor 142 increases. During the daytime, when there is sufficient light, the value of the second resistor 142 decreases. Accordingly the resistor 42 allows the lighting device to operate only when there is insufficient light, i.e., at night.

The boost-up circuit is connected to the light operated circuit, in parallel with the first resistor 141 and the second, light-dependent resistor 142. A first circuit node 143 is defined between the switch 140 and the first resistor 141. Connected to the node 143, is an emitter terminal of a first triode 144. A collector terminal of the first triode 144 is connected in series with a 100 k.OMEGA. third resistor 145. The third resistor 145 is then connected to a point between the first resistor 141 and the second resistor 142.

A 220 k.OMEGA. fourth resistor 146 is connected to node 143 across the emitter and base terminals of the first triode 144. In parallel with the fourth resistor 146, and also connected across the emitter and base terminals of the first triode 144, is a 4.7 nF first capacitor 148.

Further connected to node 143, across the emitter and base terminals of the first triode 144 and in parallel with each of the fourth resistor 146 and the first capacitor 148, is a 100 .mu.H inductor 149 in series with a 1 nF second capacitor 150. The second capacitor is then connected to the base terminal of the first triode 144.

A 20 k.OMEGA. fifth resistor 151 is connected across the base and collector terminals of the first triode 144. Connected across the terminals of the third resistor 145 are the collector and base terminals, respectively, of a second triode 152. The emitter terminal of the second triode 152 is connected to the negative terminal of the batteries 133. Connected between the inductor 149 and the second capacitor 150 is the collector terminal of a third triode 153. The base terminal of the third triode 53 is connected via an intermediary circuit to the collector terminal of the second triode 152. The intermediary circuit consists of a 2.4 k.OMEGA. fourth resistor 154 in parallel with a 1 nF third capacitor 155. The emitter terminal of the third triode 153 is connected to the negative terminal of the battery 133.

Also connected between the inductor 149 and the second capacitor 150 is the rectifier circuit. A forward biased second diode 156 is connected to a point between the inductor 149 and the second capacitor 150, and then to a positive terminal of a 33 .mu.F fourth capacitor 157. The negative terminal of the fourth capacitor 157 is connected to the negative terminal of the battery 133. A second circuit node 158 is defined between the second diode 156 and the fourth capacitor 57. Connected in parallel with the fourth capacitor 157, between the second node 158 and the negative terminal of the battery 133 is a reverse biased 4.5V third diode 159. The second diode 156, the fourth capacitor 157 and the third diode 159 comprise the rectifier circuit. Further connected to the second circuit node 158, in parallel with each of the capacitor 157 and the reverse diode 159, is a light circuit 160.

The light circuit 160 contains an integrated circuit (IC) 161 for controlling lighting effects provided by the lighting device 110. In the embodiment shown, the IC 161 is a 16 pin, three color LED IC for controlling first, second and third light emitting diodes (LEDs) 134A, 134B and 134C. Each of pins 1, 15 and 16 is connected in series to respective switches 169, 170, 160. Each of the switches 169, 170 and 71 is then connected to the negative terminal of the battery 133. In one embodiment, the switches 169, 170, 171 correspond to the LEDs 134A, 134B, and 134C to enable or disable a particular color range. In another embodiment, the switches 169, 170, 171 determine the frequency of a color changing effect.

In a further embodiment, the switches 169, 170, 171 determine the intensity of light emitted by each of the LEDs 134A, 134B, and 134C. Various combinations of the frequency and intensity of light are also possible. The switches 169, 170, 171 can be made accessible to a user to create custom lighting effects. Alternatively, the switches 169, 170, 171 are set according to a predetermined configuration and are not readily accessible by a user.

Pin 4 of the IC 161 enables an optional pause function. In this embodiment, pin 4 connects to a push button 165 that is, in turn, connected to the negative terminal of the batteries 133. Pin 3 of the IC 161 connects to the second circuit node 158. Connected to the second circuit node 158, and in parallel with one another, are the first second and third forward biased light emitting diodes (LEDs) 134A, 134B and 134C.

The first LED 134A is connected in series with a sixth resistor 166 that is connected to pin 13 of the IC 161. The second LED 134B is connected in series with a seventh resistor 167 that is connected to pin 12 of the IC 161. The third LED 134C is connected in series with an eighth resistor 168 that is connected to pin 11 of the IC 161. In this example, the first LED 134A is blue, the second LED 134B is green and the third LED 134C is red.

Pins 6 and 8 of the IC 61 are tied to one another via a ninth resistor 172, which in the embodiment shown is a 20 KW resistor. The valve of the ninth resistor 171 determines the frequency of a color change created by the IC 161. Accordingly, using different resistor valves for the ninth resistor 171 produces color changes of different frequencies. Pin 9 of the IC 61 is tied to the negative terminal of the battery 33.

Figure 4:
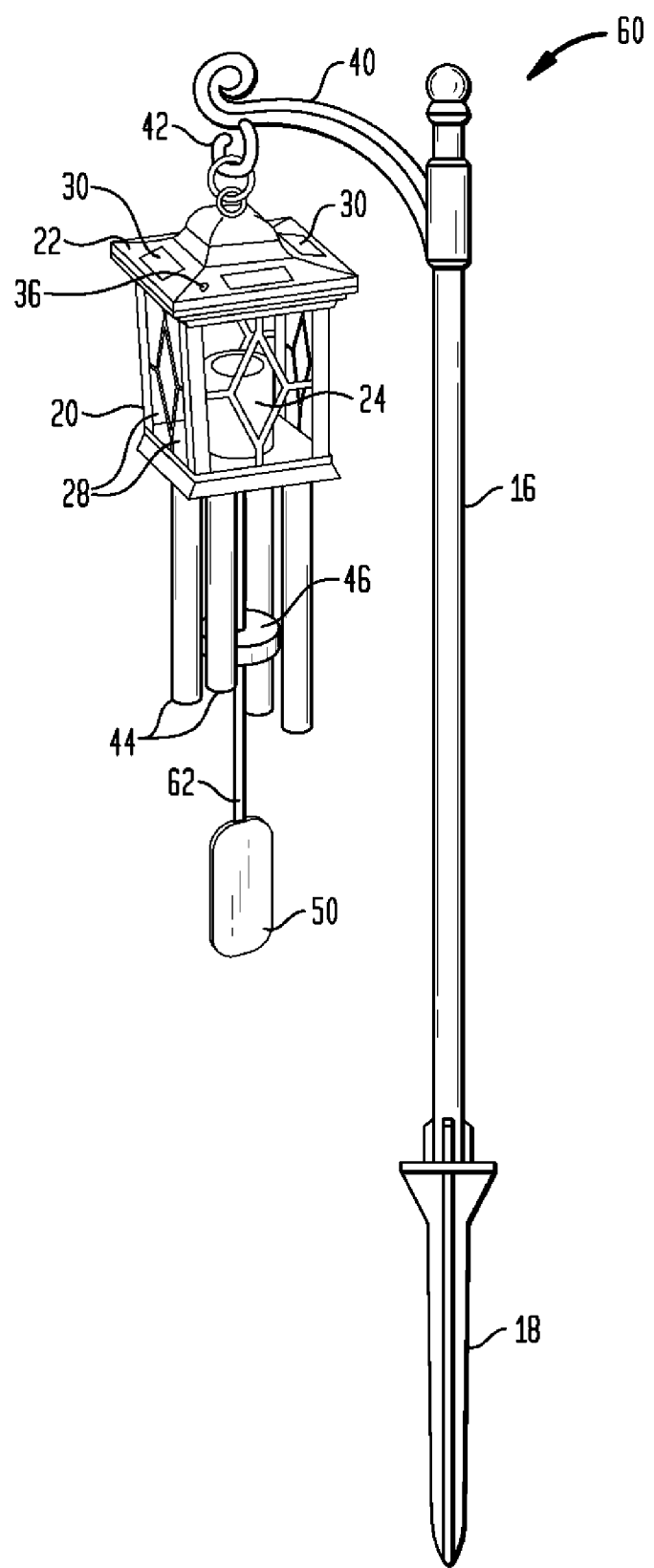
FIG. 4 is a diagrammatic perspective view of a wind indicator in accordance with an alternative embodiment of the present invention.
Figure 5:
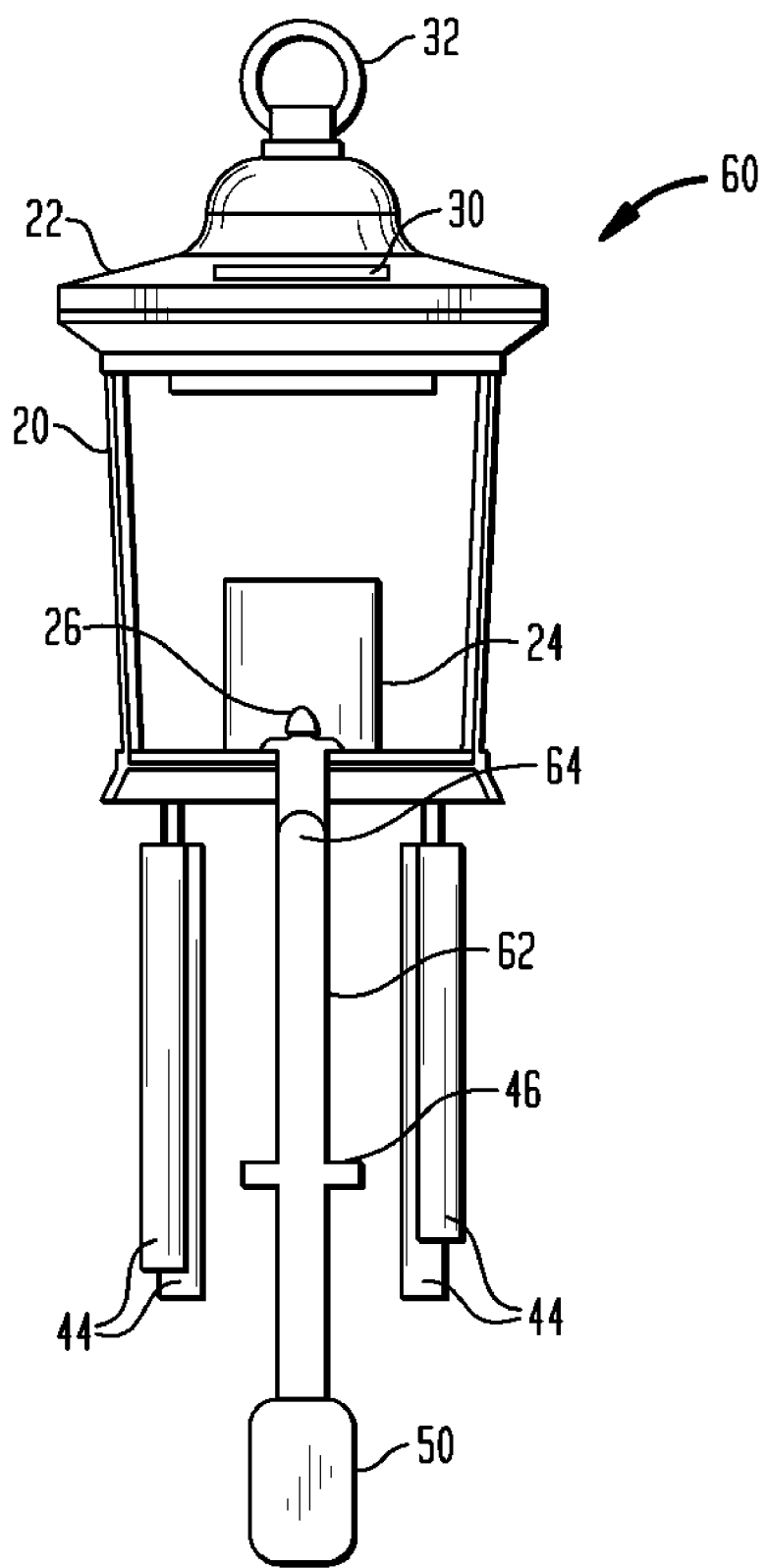
FIG. 5 is a diagrammatic view in part cross-section of the wind indicator shown in FIG. 4.

FIG. 4 is a diagrammatic perspective view of a wind indicator 60 in accordance with an alternative embodiment of the present invention and FIG. 5 is a diagrammatic view in part cross-section of the wind indicator shown in FIG. 4.

The wind indicator 60 may include circuitry similar to the circuitry shown in FIG. 2.

The wind indicator 60 illustrated in FIG. 4 differs from the wind indicator 10 in that instead of providing a second light emitting element 52 disposed in the pendulum 50, only one light emitting element 26 is provided, the light emitting element 26 being disposed in the light source 24 and the pendulum 50 being suspended from the housing portion 20 by a transparent or translucent tube 62. In order to facilitate movement of the tube 62, the tube 62 may be connected to the housing 20 by a pivot connection 64 or by any other suitable connection arranged to facilitate movement of the tube 62 by the wind.

With this arrangement, the striker 46 and/or the pendulum 50 may also be formed of transparent or translucent material.

During use, light from the light source 24 passes through the panels 28 of the housing portion 20 and also passes downwards through the tube 62 so as to illuminate the tube 62 and, in variations wherein the striker 46 and/or the pendulum 50 are also formed of transparent or translucent material, so as to also illuminate the striker 46 and/or the pendulum 50.

Other arrangements are also envisaged. For example, the tube 62 may be formed of opaque material and the striker 46 and/or the pendulum 50 formed of transparent or translucent material so that light passing downwards through the tube 62 from the light source 24 is emitted by the striker 46 and/or the pendulum 50.

As a further alternative, instead of providing a plurality of chime members 44, a bell may be moveably suspended from the housing portion 20 and the pendulum assembly disposed inside the bell.

Figure 6:
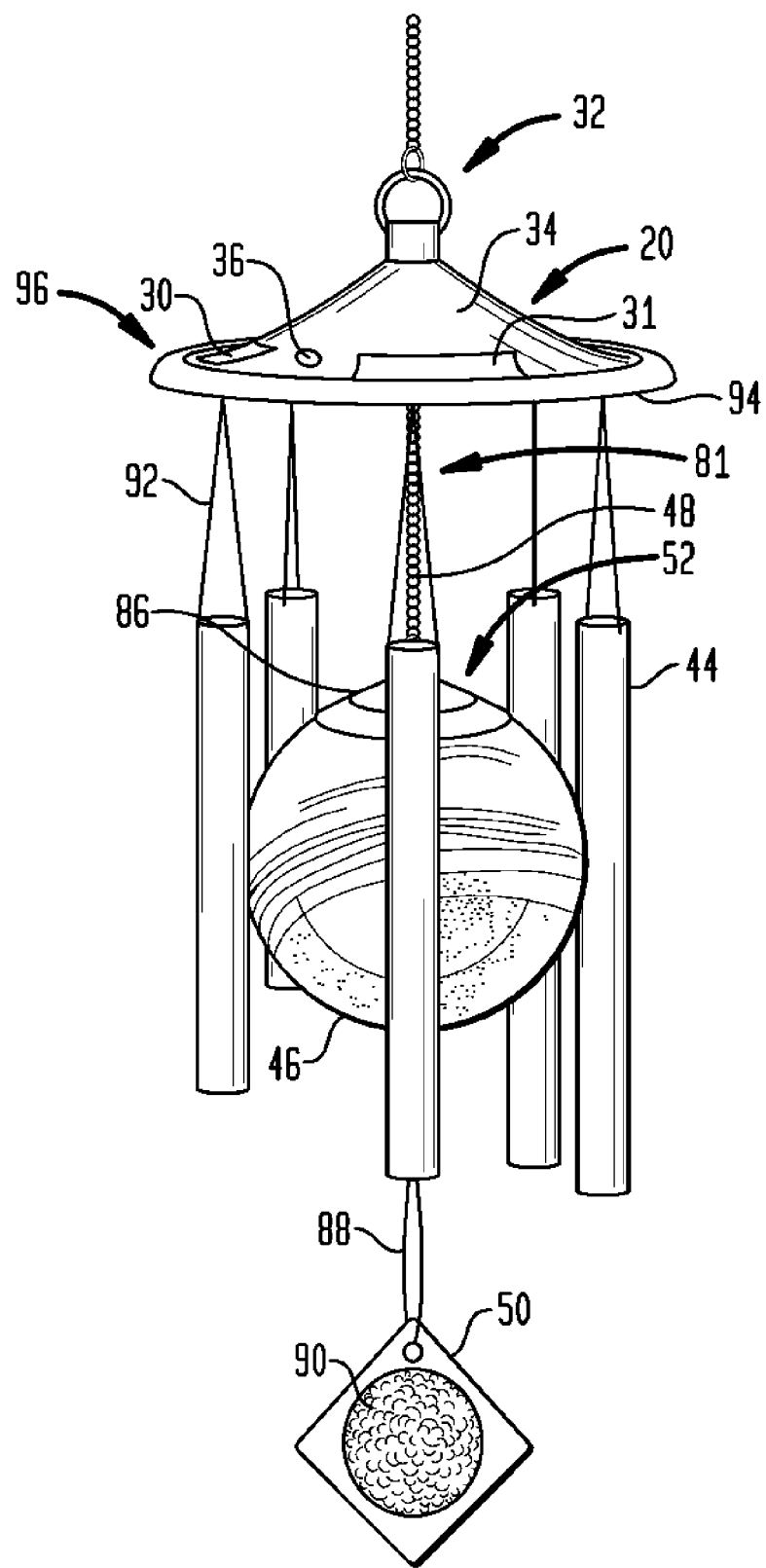
FIG. 6 is a diagrammatic view of a further embodiment of the invention.

FIG. 6 is a diagrammatic view of a further embodiment of the invention.

In the embodiment illustrated in FIG. 6, the light device 96 includes a housing portion 20 which may be made from metal, plastic, wood or other suitable material or combination thereof. Preferably, the upper portion of the housing 20 is made from a non-rusting metal such as brass or aluminum and the lower portion of the housing is made from plastic. Disposed upon the surface of the housing portion 20 are several solar photovoltaic panels 30 that in the present embodiment are of a crystalline silicon structure. Preferably the solar panels are assembled using a lamination process as opposed to an epoxy embedded process. As an alternative, one or more amorphous silicon type solar panels may be used. Disposed within the housing is a rechargeable power source which is recharged by the solar panels 30. In this embodiment the rechargeable power source is in the form of two AA size 600 mA/hour nickel cadmium batteries 31 (not shown). Alternatively, other rechargeable power sources may be used including one or more nickel metal hydride batteries, rechargeable alkaline batteries, lead acid batteries, lithion ion batteries or similar. Access to the batteries for replacement is through a user accessible battery compartment 94 (not shown) located on the underside of the housing 20. A power supply circuit connects the solar panels 30 in series to a forward based diode, which is in turn connected to a positive terminal of at least one battery 31. A negative terminal of the battery 31 is then connected to the solar panel 30 to complete a power supply circuit. In this example the diode may be a model number IN5817 Schottky diode. It will be apparent to a person skilled in the art that other diode and battery configurations may be utilized without departing from the spirit and scope of the invention. When the solar panel 30 is exposed to sufficient light, the solar panel 30 converts some of the solar energy to electrical energy and creates a current that passes through the diode to charge the battery 31. Thus, during the day the solar panel 30 converts energy from the sun to charge the battery 31. The diode prevents the battery 31 from expending any power on the solar panel 30.

Also located within the housing is the control unit 34 (not shown) which may be arranged to sense the ambient light level, for example, in the present example, a light dependent cadmium sulfide resistor 36 located in a light exposed location on the housing, and if a determination is made by the circuit that insufficient ambient light is available, a connection is made between the batteries 31 and the light source 52 and or light source 50. If a determination is made that sufficient ambient light is available, a connection is not made between the batteries 31 and the light source 52 and or light source 50 and current does not flow from the batteries. Specifically, the positive terminal of the battery 31 is connected to a switch (not shown), which is in turn connected to a 100 k.OMEGA. first resistor (not shown). The first resistor is connected in series with a second, light dependent resistor 36. The second resistor 36 connects to the negative terminal of the batteries 31 to complete the lighting circuit. The value of resistance of the second resistor 36 depends upon the amount of light to which the second resistor 36 is exposed. When there is not much light, such as occurs at night, the value of the second resistor 36 increases. During the daytime, when there is sufficient light, the value of the second resistor 36 decreases. Accordingly, the resistor 36 allows the lighting circuit to operate only when there is insufficient light, i.e. at night.

The chime portion includes a plurality of chime members 44 moveably suspended from the housing portion 20, and a pendulum assembly also moveably suspended from the housing portion 20. In this example, the chime members 44 are suspended within a substantially fixed radius equidistant of a central pendulum assembly.

In this example, the pendulum assembly includes a striker orb 46 suspended using a metal chain 81. Also, connected to the striker orb 46 are electrical wires 48 which pass from the housing into the striker orb. In this example, the electrical wires 48 are electrically connected to a light emitting element, in this example in the form of an LED 52, the LED 52 being disposed inside the striker orb 46 and the striker orb 46 being formed at least partly of a suitable translucent or transparent material. In this example that material is glass. Alternatively and additionally, the electrical wires pass through the striker orb to a pendulum wind catcher 50 disposed at the end of electrical wires 88 remote from the housing 20. In this alternative, the electrical wires 88 are electrically connected to a second light emitting element, in this example in the form of a second LED 90, the second LED 90 being disposed inside the pendulum wind catcher 50 and the pendulum wind catcher 50 being formed at least partly of a suitable translucent or transparent material. The pendulum wind catcher 50 harnesses the power of the wind and transfers it to the striker orb 46, which moves to strike the chime members 44 and thus create an acoustic sound.

It will be understood that since light is emitted by the striker orb 46 and/or the pendulum wind catcher 50, as the wind impinges on the pendulum wind catcher, the pendulum will be caused to move, thereby providing a visual indication of wind levels as night. In this way, it is possible for a user to discern from a lateral distance that wind is present even if the wind is not strong enough to cause the striker orb 46 to contact one or more chime members 44. Further, if the striker orb 46 is illuminated and the wind is strong enough to cause the striker orb 46 to move, this thereby provides a visual indication of stronger wind levels as night. In the alternative where both the striker orb 46 and the pendulum wind catcher 50 are illuminated, the relative movement of the pendulum wind catcher 50 and the striker orb 46 are visible at night thus providing more detailed visual indication of wind levels as night.

The pendulum wind catcher 50, is of appropriate cross section to be accelerated by local wind conditions, and is of sufficient mass to translate appropriate kinetic energy to the striker orb 46, In this regard, the pendulum wind catcher 50 is preferably at least 20% the mass of the striker orb 46. In one embodiment the pendulum wind catcher 50 is about 32 square inches and has a weight equal to 25% of the striker orb 46. The larger surface area of the pendulum wind catcher for any given size chime and pendulum wind catcher 50 weight, the less wind is needed to activate it. This embodiment will typically result in chime members 44 sounding in eight to ten mile-per-hour breezes.

In one embodiment there are three LEDs of different colors being red, green and blue controlled by an integrated circuit (IC) powered by the battery 31 electrically connected to the lighting circuit and connected independently to each of the LEDs for controlling and varying the brightness of each of the three LEDs independently of the other LEDs such that the LEDs together provide the effect of a continuously changing color spectrum. The IC independently ramps up and down the brightness of each LED in a sequence and at a speed to produce a wide spectrum of colors where each color is visible for a similar period of time. The timing of the ramping up and down of the LEDs is not constant because some colors are produced by mixing the light of two or more different colors. If the LED brightness change is constant then these mixed colors such as cyan, orange, purple, and green are only visible for a much shorter time than the primary colors during the transition between the display of the primary colors. Accordingly, the ramping speed of the LEDs are varied during the display of mixed colors to extend the visible time of those colors to have a similar visibility duration as the primary colors red, green and blue. Alternatively, there may be a two light sources of different colors instead of three. Alternatively, there may be a multiple of each of either the three LEDs above or the two light sources above.

In one embodiment there is a user operable switch that activates the IC to select a desired fixed color. This user operable switch is preferably a push button switch but may be a slide switch or other type of user operable switch. The color selection is stored in memory within an IC in the circuit.

The chime members 44 are preferable made from anodized aluminum or electroplated aluminum or brass. It will also be understood that at least part of the light emitted by the striker orb 46 and/or the pendulum wind catcher 50 during use will be reflected by the surface of one or more chime members 44, thereby enhancing the aesthetic appeal of the wind chime at night and also a further visual indication of wind levels as night. In one embodiment chime members are tuned to A440, a standard orchestral pitch. In another embodiment the chimes members 44 are tuned to the fundamental frequency of C2. In this embodiment aluminum is the preferred chime member material to produce the best sound for fundamental C2. For "non-bell sounding" chime embodiments tuned to fundamental C6 then brass, copper or aluminum are equally preferred as chime member 44 materials.

Preferably, a corrosion-protective finish is applied to the chime members 44 to preserve the aesthetic appearance and increase durability in hostile environments (acid rain, salt air).

The chime members 44 are suspended from the housing 20 by suspension lines 92. The suspension lines 92 are preferably made from a nylon that is highly resistant to abrasion, ultra-violet degradation, rot and mildew. The fundamental vibrational node of a tube occurs at 22.4% of the tube length from each end. Accordingly, the chime members are suspended and the suspension lines 92 are attached to the chime members 44 from a distance approximately 22.4% from the end of the chime members 44 to reduce attenuation caused by energy wasted vibrating the chime members 44.

Preferably, the suspension lines 92 are centrally suspended from within each chime member 44 attached to a horizontal cross line that is attached to both drill support holes. with smoothly polished tube ends to prevent line. Alternatively, the suspension lines are suspended directly from the drill support holes. In this embodiment, the drill support holes for affixing the suspension lines to the chime members are de-burred and burnished to minimize wear and tear of the line.

The striker 46 may be made from polyethylene, wood, glass, resin or another material and is hung from the housing 20 from a central point of this radius and is usually of such a diameter to give a distance of 0.75" to 1.5" to the suspended chime members 44. The striker 46 may be in the shape of an orb, sphere, disc or other suitable shape that is substantially round in the widest horizontal plane. A striker 46 to chime members 44 distance of 0.75-1.00" is suitable for moderate wind conditions. For a lower frequency chime sound a soft, heavy striker 46 is preferred and for a higher frequency chime sound a harder, lighter striker 46. Some embodiments use a short distance to produce a softer or slower strike since less time is provided for striker 46 acceleration (from wind blowing the pendulum wind catcher 50) from the concentric point, but allows strikes under low wind conditions. Some embodiments use a larger distance to provide a harder or faster strike, but demands higher wind conditions to do so. The striker orb may also hook directly onto the center of the underside of the housing 20 creating a convenient acoustic "off-on" feature.

There are two preferred vertical locations on the chime members 44 that work well for striking by the striker orb 46. One embodiment is a "non-bell sounding chime" for to produce the acoustic fundamental C6 and upwards. For these embodiments, striking at the center or the end of the chime member 44 is equally preferable. Alternatively, one embodiment is a "bell sounding" chime sound where it is preferred to excite all possible frequency modes for good overtone representation. In this embodiment striking at the very end of the chime member 44 is preferred. Striking at the end will assure the excitation of all modes since all modes exhibit high impedance at the end of the chime member 44.

Figure 7:
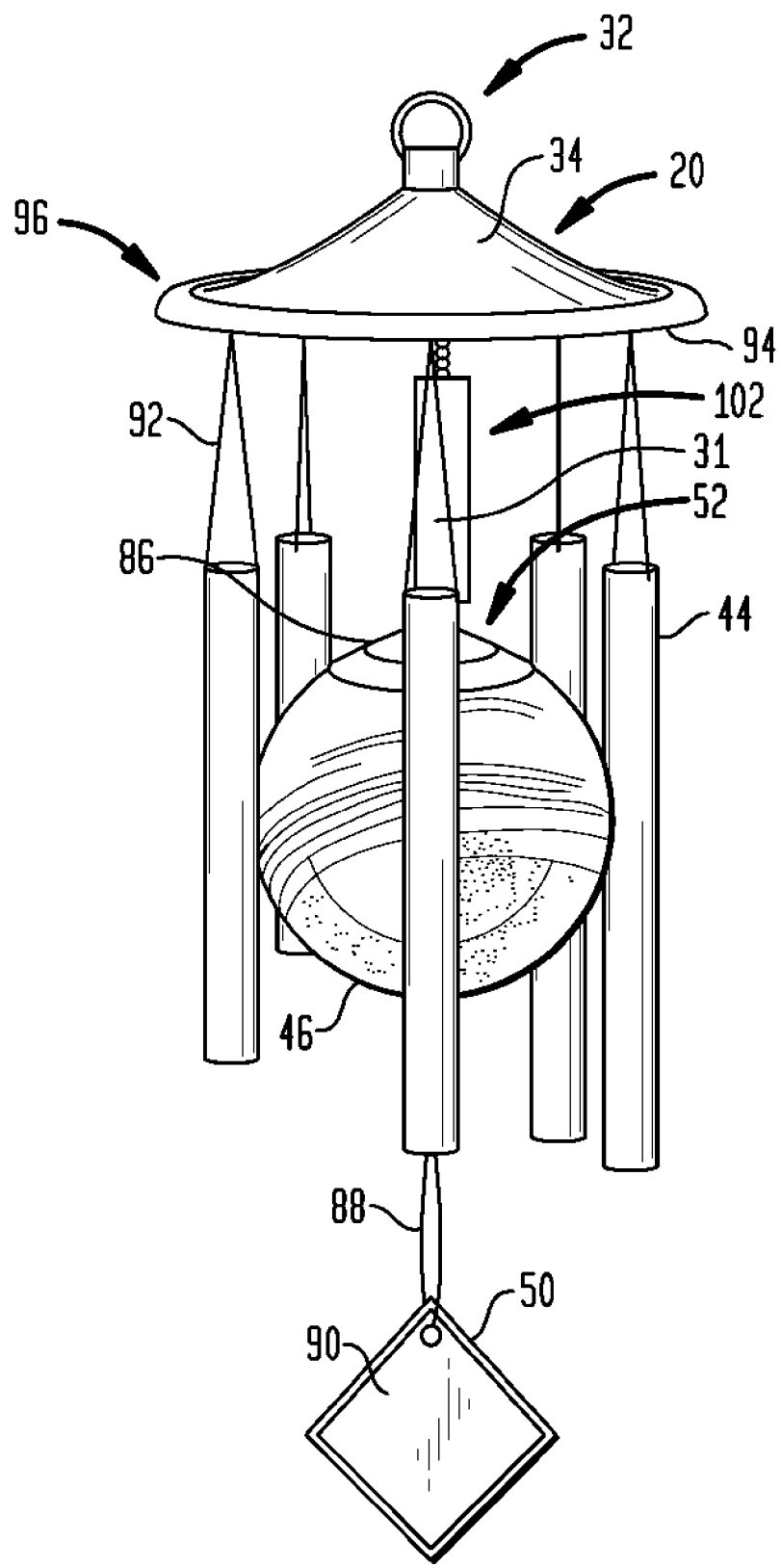
FIG. 7 is a diagrammatic view of another embodiment of the invention.

FIG. 7 is a diagrammatic view of another embodiment of the invention.

In the embodiment illustrated in FIG. 7, the electrical device 96 includes a housing portion 20 which may be made from metal, plastic, wood or other suitable material or combination thereof. The housing may have a solid surface or be a horizontal open ring type commonly found in wind chimes where a ring is suspended below a central hanging point, the ring acting a spacer and support for the chime members suspended below it. Preferably, the major portion of the housing 20 is made from a non-rusting metal such as brass or aluminum. A rechargeable power source is disposed within the housing 20. Alternatively, disposed within the pendulum assembly above the striker is a compartment 102 housing a rechargeable power source 31, and control circuitry. This structure may utilize a simple ring suspension system such as commonly found in wind chimes thereby alleviating the need for a fully covered housing. In one embodiment, there exists a battery housing 102 in which the batteries 31 are vertically oriented. The battery housing 102 may be suspended from a central hanging point. The rechargeable power source 31 is preferably recharged by two vertically oriented parallel and outwardly facing amorphous silicon solar panels 90 located at the end of a pendulum 50 suspended by electrical wires 88 from the housing 20 or in an alternative embodiment, from the battery compartment 102. In such an embodiment, the rechargeable power source is in the form of two AA size 600 mA/hour nickel cadmium batteries 31 (not shown). Access to the batteries for replacement is through a user accessible battery compartment 102 (not shown) located under the housing 20 and above the striker 46. A power supply circuit connects the solar panels disposed in the pendulum 50 in series to a forward based diode, which is in turn connected to a positive terminal of at least one battery 31. A negative terminal of the battery 31 is then connected to the solar panel 90 to complete a power supply circuit. In this example the diode may be a model number IN5817 Schottky diode. It will be apparent to a person skilled in the art that other diode and battery configurations may be utilized without departing from the spirit and scope of the invention. When the solar panel 90 in the pendulum 50 is exposed to sufficient light, the solar panel 90 converts some of the solar energy to electrical energy and creates a current that passes through the diode to charge the battery 31. Thus, during the day the solar panel 90 converts energy from the sun to charge the battery 31. The diode prevents the battery 31 from expending any power on the solar panel 90.

Also located within the housing is the control unit 34 (not shown) which may be arranged to sense the ambient light level, for example, in the present example, a light dependent cadmium sulfide resistor located in a light exposed location on the housing, and if a determination is made by the circuit that insufficient ambient light is available, a connection is made between the batteries 31 and the light source 52 and or light source 50. If a determination is made that sufficient ambient light is available, a connection is not made between the batteries 31 and the light source 52 current does not flow from the batteries. Specifically, the positive terminal of the battery 31 is connected to a switch (not shown), which is in turn connected to a 100 k.OMEGA. first resistor (not shown). The first resistor is connected in series with a second, light dependent resistor 36. The second resistor 36 connects to the negative terminal of the batteries 31 to complete the lighting circuit. The value of resistance of the second resistor 36 depends upon the amount of light to which the second resistor 36 is exposed. When there is not much light, such as occurs at night, the value of the second resistor 36 increases. During the daytime, when there is sufficient light, the value of the second resistor 36 decreases. Accordingly, the resistor 36 allows the lighting circuit to operate only when there is insufficient light, i.e. at night. Alternatively, the light sensitive resistor and operative circuitry may be located in a suspended battery compartment 102.

The chime portion includes a plurality of chime members 44 moveably suspended from the housing portion 20, and a pendulum assembly also moveably suspended from the housing portion 20. In this example, the chime members 44 are suspended within a substantially fixed radius equidistant of a central pendulum assembly. It will be understood that in the example where the housing is a ring, the chime members 44 are suspended from the ring and the pendulum assembly may be suspended from a central hanging point.

In this example, the pendulum assembly includes a striker orb 46 suspended from the battery compartment 102. Also, connected to the striker orb 46 are electrical wires (not shown) that pass from the battery compartment into the striker orb. In this example, the electrical wires are electrically connected to a light emitting element that in this example takes the form of an LED 52. The LED 52 may be disposed inside, or directed into, the striker orb 46. The striker orb 46 may be formed, wholly or in part, of a suitable translucent or transparent material. In this example that material is glass. Mechanical connection means to affix the striker orb to the battery compartment may also be provided in addition to the electrical wires. Such means may include a chain or wire affixed to a mounting plate 86 that is located at the upper portion of the orb 46. The mounting plate may be plastic or metal and may be mounting inside or external to the orb 46. In one example where the mounting plate is plastic and is located within the orb 46, a second plate is affixed outside the orb and connected to the first mounting via screws or rivets, and thus sandwiching the glass between the two plates and holding the glass in position. An additional decorative cover plate 86 may be provided to cover the second plate and/or the first mounting plate. A second pair of electrical wires are located between the housing and the solar panels located in the pendulum 50, the electrical wires passing through the striker orb to the pendulum wind catcher 50 disposed at the end of electrical wires 88 remote from the housing 20. The pendulum wind catcher 50 harnesses the power of the wind and transfers it to the striker orb 46, which moves to strike the chime members 44 and thus create an acoustic sound. The pendulum wind catcher also harnesses the power of the sun as it further comprises at least one amorphous silicon solar panel which converts light energy to electrical energy. As an alternative, one or more crystalline silicon structure type solar panels may be used. In that embodiment, the solar panels are preferably assembled using a lamination process as opposed to an epoxy embedded process. The pendulum wind catcher 50 incorporating the solar cell 90, is of appropriate cross section to be accelerated by local wind conditions.

It will be understood that since light is emitted by the striker orb 46, as the wind impinges on the pendulum wind catcher 50, the pendulum will be caused to move, thereby moving the illuminated striker orb 46. In this way, it is possible for a user to discern from a lateral distance at night that wind is present to cause the striker orb 46 to contact one or more chime members 44.

It will be understood that the orientation of the chime members are not necessarily circular but may be oriented in a plane with a rectangular striker. In another embodiment there is no striker and the chime members make noise by making contact with each other under the force of the wind.

Figure 8:
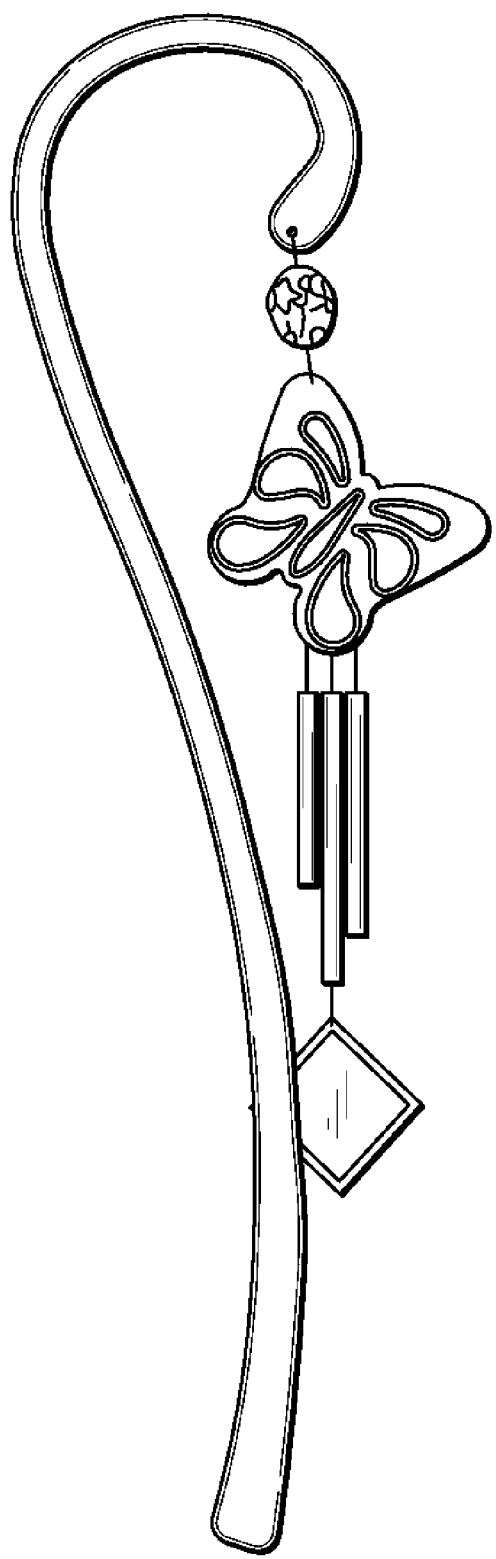
FIG. 8 is a diagrammatic view of yet another embodiment of the invention.

In one embodiment of the invention, illustrated in FIG. 8, the housing is a vertically oriented shape such as a geometric circle, square, rectangle, star, heart or design such as a bird, butterfly, dragonfly, insect, reptile, and amphibian. In one embodiment there is no striker and the housing itself is illuminated. In one embodiment the housing incorporates a ring arrangement and a vertically oriented shape. Any part of the housing, hanging means, striker or pendulum assembly may be illuminated and powered by the solar cell 90 located in the pendulum assembly 50.

Figure 9:
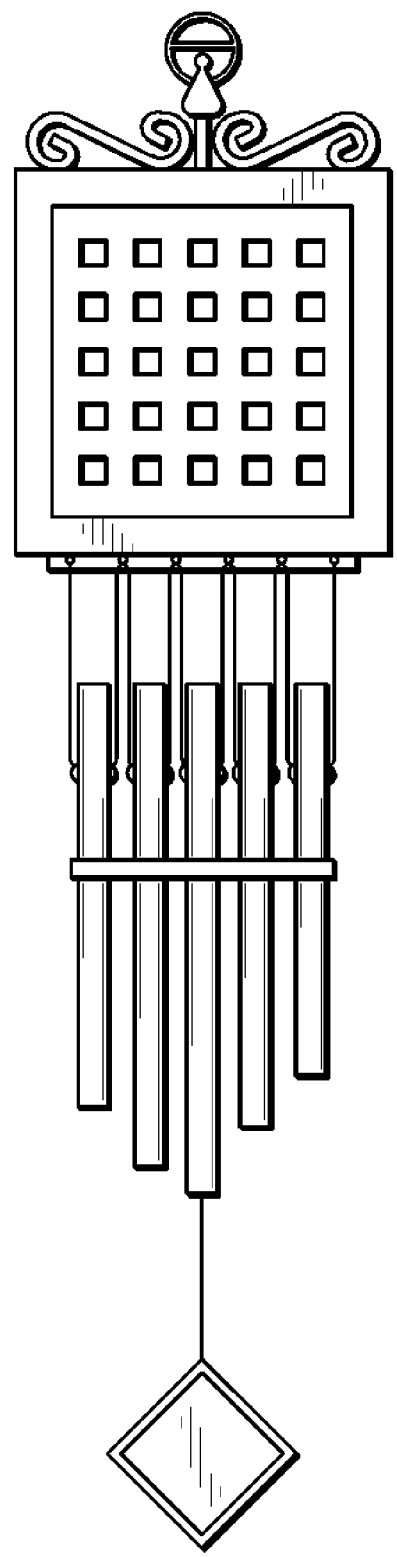
FIG. 9 is a diagrammatic view of one more embodiment of the invention.

In an alternative embodiment of the invention, illustrated in FIG. 9, there is no light source disposed within or on the wind chime. Instead the solar panel 90 located on the pendulum 50 provides a visual indication of wind and also provides power to an electrical circuit that may have one or more functions. One function may include the production of an electronic sound or melody to simulate the sound of a wind chime when in use or of another sound including animal sounds such as birdsong or insect noises. This embodiment could also be used indoors near a window where wind is not present. Another function may include powering an insect deterring or killing device. Yet another function may include an environmental sensor such as a temperature sensing device that is powered by the solar cell and transmits information about the temperature and or the presence of wind to another location by radio frequency means.

Many of the embodiments illustrated above have used LEDs to emit the light. One of ordinary skill in the art would readily appreciate that the LED's could be replaced by any suitable light source, including a suitable luminescent material that may be a fluorescent material or a phosphorescent material.

For instance, in the embodiments of FIG. 6 and FIG. 7, the orb 46 may effectively be a lens that admits light. The lens can be made of glass, plastic, resin, or glass fibers. The lens material includes any formed material conventional to the art, such as glass, plastic or resin or glass fibers. In the present embodiment, the lens is made of glass and shaped like a sphere, having an internal layer of phosphorescent material on part of the spherical inside wall thereof. Alternatively, the glass may be impregnated directly with the phosphorescent material. The phosphorescent material may be a phosphorescent pigment. A light emitting outdoor fixture has a hollow lens that is partially impregnated or coated with a light transmissive phosphorescent element.

The luminescent material or pigment may be one or more of: Alkaline Earth Metal Aluminate (and can include Strontium, Magnesium, Calcium, and Barium, Silicon and Titanium and typically doped with Europium), Alkaline Earth Aluminate w/Fluorescent Pigment, Coated Alkaline Earth Aluminate, Alkaline Earth Silicate, and Zinc Sulfide. If Zinc Sulphide is used it needs to be waterproofed because is subject to humidity damage that causes graying of the luminescent material. The elemental zinc separates from the crystals and migrates to the surface of the material, reducing luminance.

Preferably, there is no sulfur, uranium doped, or large amounts of Zinc mixed in with any of the luminescent material or pigment. Silicate base may be added to the manufacturing process to aid with the color melting into the glass surface. Alternatively, if the luminescent material or pigment is suitable for use with the heat involved with glass working, it can be mixed in with raw clear glass powder. Large clumps of luminescent material or pigment should be avoided because this may cause the piece to crack during cooling. Very fine diameter luminescent material or pigment is preferable.

The lens has one end connected to a base. The inside space of the lens may be sealed by the base. Alternatively or additionally, the phosphorescent material may be coated with a light transmissive waterproof coating. An ultraviolet LED (light emitting diode) may be installed in the space within the lens, or light from the LED may be directed into the lens. After connection of the base 12 to a battery, electric current is connected to the LED, causing the LED to emit ultraviolet light to strike the phosphorescent material, and therefore the phosphorescent material is caused to emit visible light. Further, the inside space of the lens may be an empty space. The UV LED may be directed into the lens and powered by a solar rechargeable battery source. A printed circuit board mounted controller may serve to automatically vary the brightness of the light source. Further, the printed circuit board mounted controller may selectively activate the light source in a time pulsed manner, In one embodiment of the wind indicator illustrated in FIG. 7, the illuminated fixture comprises a light emitting diode (LED) (not shown) located proximate to a light transmissive lens orb 46 whereby the lens is illuminated from within by the LED.

The lens orb 46 forms a chamber and may be substantially constructed from hand-blown glass and comprises fluorescent and luminescent elements within it. The lens is sealed to prevent moisture from reaching said fluorescent and luminescent elements.

This is achieved because a substantial percentage of the light emitted by the LED is in the ultraviolet light spectrum so that the LED emits at least some light in the blacklight ultraviolet wavelength spectrum.

At least some part of said lens orb 46 exhibits fluorescence when excited by said LED and exhibits phosphorescence by emission of light by a luminescent element after excitation by the LED has ceased. The provision of the ultraviolet LED proximate to the phosphor assures that upon activation of the LED, the phosphor is excited and continues to phosphoresce after the LED has been deactivated.

Regardless of the application method, once the phosphorescent material is proximate to the surface of the lens, the UV LED directed into or located within the lens affords a highly efficient excitation of the phosphor resulting in efficient phosphorescent emission. A UV LED operative in the present invention preferably emits either UV-A corresponding to between 315 nm and 405 nm or UV-B corresponding to between 280 nm and 320 nm. Operative UV LEDs herein include gallium indium nitride and gallium nitride.

Preferably, power is provided to the LED by a rechargeable battery that is charged by a solar photovoltaic panel made from silicon. The battery source is selected according to the present invention to have a voltage output to activate the light source. Battery types operative herein alone or in series to increase the output voltage include nickel cadmium, nickel metal hydride, rechargeable alkaline and lithium batteries.

A user operable switch may selectively illuminate the LED. A battery (not shown) within the housing selectively forms a circuit with contacts of the switch and leads of the LED upon switch engagement. The emission from the LED is directed onto phosphorescent laded glass lens from within. The now stimulated phosphorescent pigments emits visible light for a period of time consistent with the phosphorescent particulate decay time during the evening hours after the LED ceases to illuminate.

As a rule of thumb, if emission stops after the excitation source has been removed, then the resulting luminance is called fluorescence; if emission continues (so called "afterglow") then it is called phosphorescence.

The excitation time and saturation are primarily dependent on ultraviolet irradiance of the material. Phosphorescent paints, enamels and colorants are well known to the art and include, for example, U.S. Pat. Nos. 1,407,534; 1,637,963; 2,463,182; and 5,472,737. The choice of phosphor being dictated by the desired color of phosphorescence. Exemplary phosphor materials known to the art illustratively include group II metal-calcogenides, rare earth oxides, sulfides, phosphates, and combinations thereof doped with lanthanide series ions, such as $CaSr_2S:Bi$, $CaAl_2O_4:Eu$, Nd; and CaSrS: Eu, Dy. Specific compositions and colors are well known to the art as detailed, for example, in U.S. Pat. Nos. 2,372,071; 2,979,467; 5,043,096; 4,857,228; 5,424,006; and 5,376,303.

It is appreciated that multiple color phosphors are readily applied to a lens to yield regions of differing color emission.

The best light sources for excitation are those rich in ultraviolet light.

The fixture may have a second housing attached to the lens orb 20 which is made partly made from a plastic material that has ultraviolet stability to reduce color shifting caused by prolonged exposure to ultraviolet light.

Electrically connected to the housing resides a light source is directed into or located within the lens, one or more a nickel cadmium batteries, a printed circuit board mounted controller, and a switch.

The light source includes at least one of, at least LED, and a phosphorescent emitter element. Preferably, the light source is a light emitting diode (LED). The light source may also has a variable color output provided by at least two light emitting diodes where the first light emitting diode has a first single color output and a second light emitting diode where the first color output differs from the second color output. Preferably, in one of the instances of a single LED, or multiple LEDs, the light source includes a UV output or UV LED. The variable color light source optionally includes a third light emitting diode having a third color output, where the third color output varies from the second color output. The variable color output of the light source is varied automatically through the printed circuit board controller, which automatically cycles the light source color upon initial switch activation and continues to cycle the colors until switch deactivation. Typical cycle times range from 5 to 300 seconds.

Alternatively, the controller may vary the brightness of the light source up and down in brightness. Optionally, the cycle includes a period of no emission to allow for isolate visible phosphorescence emission. When multiple light sources are present, it is appreciated that two or more light sources having different emission characteristics can be controlled to afford different illumination levels and therefore a varying color emission. Preferably, the light source is oriented to direct a majority of the emission there from into and through the lens.

In an alternative embodiment, the light source is a UV LED, as described with respect to and the lens is decorated with a phosphorescent pigment that is stimulated by the emission of UV LED. Preferably, when the light source is UV LED, the UV LED is activated in a time pulsed manner by the controller consistent with the decay time of the phosphor pigment.

The switch is provided for selectively forming an electrical engagement between the light source and the battery source. Preferably, the switch is automatically activated by light levels through the use of a cadmium sulfide light activated resistor. Preferably the switch is a first switch and a there is second a manual user operable switch. The second switch is preferably accessible externally to the lens.

Optionally, the printed circuit board mounted controller modifies the battery source output voltage to either increase or decrease the battery output voltage to more closely correspond to the light source activation voltage. Preferably, the modified battery output voltage is within 20 excess percent of the light source activation voltage. More preferably, the modified output voltage is within 10 excess percent of the light source activation output voltage. In instances where a light emitting diode is the light source, it is often the case that the light emitting diode activation voltage is greater than that of a single dry cell or lithium battery output voltage and as such multiple batteries operating in series are required to drive the light emitting diode. Additional batteries increase the cost of the lighting device. As such, the use of a conventional transformerless voltage step-up circuit may be employed to increase the battery output voltage to at least that of the LED activation voltage. Typically, step-up circuitry increases the battery output voltage by a factor of between 1.6 and 3 in order to provide sufficient voltage to drive a light emitting diode at its activation voltage or above.

Figure 10:
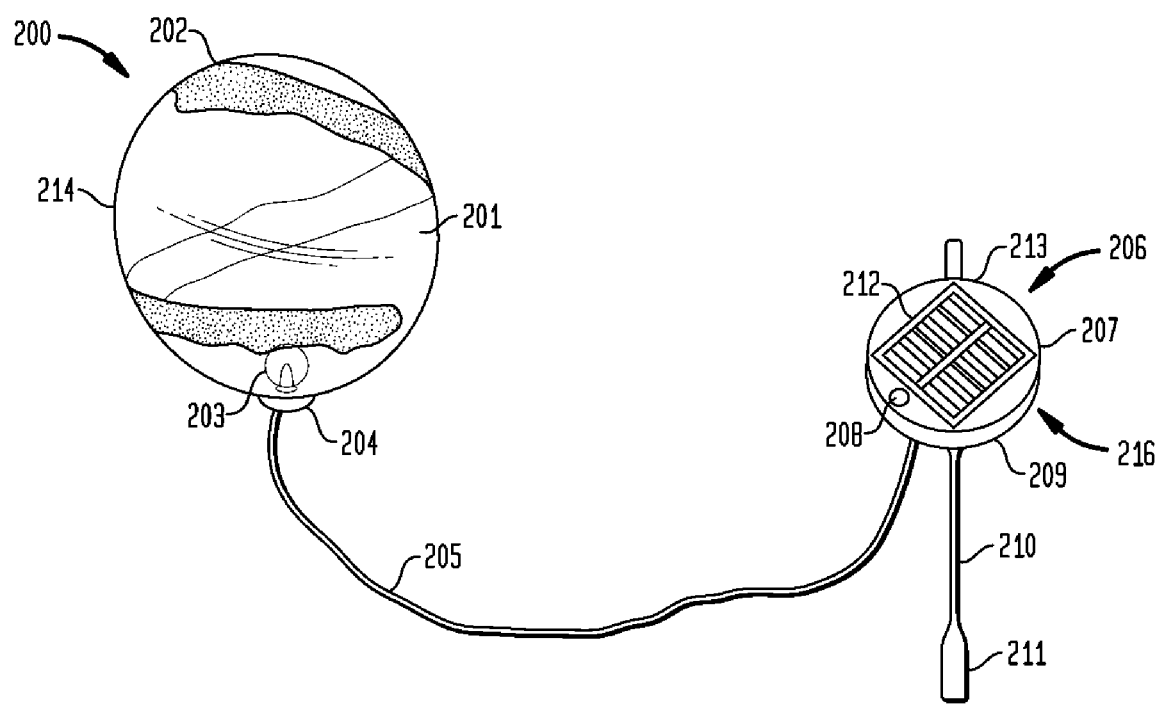
FIG. 10 is a diagrammatic view of a further embodiment of the invention.

FIG. 10 is a diagrammatic view of a further embodiment of the invention.

In the embodiment illustrated in FIG. 10, the light device 200 includes a lens portion 214 which may be made from plastic, glass, resin or other suitable light transmissive material or combination thereof. Preferably, the lens portion 214 is made from hand-blown glass. Preferably the lens portion 214 is substantially spherical except for its lower extremity. In the present embodiment, the lens portion 214 has an internal layer of fluorescent or phosphorescent material or pigment 202 on part of the spherical inside wall thereof. In the present embodiment the pigment 202 is formed in the shape of a rising swirl. Alternatively, the glass may be impregnated directly with phosphorescent pigment. The lens portion forms a chamber and is substantially constructed from hand-blown glass which may have different colored glass elements 201 providing some contrast. The lens portion 214 may further comprise fluorescent and luminescent elements 202 within it. The lens portion 214 is preferably sealed to prevent moisture from reaching the fluorescent and luminescent elements 202. Thus there is a light emitting outdoor fixture 200 having a hollow light transmissive lens 214, which is partially impregnated or coated with a light transmissive phosphorescent element 202.

Attached to the lens portion 214 is a base portion 204 which is preferably made of a thermoplastic but may be made from metal or other suitable material or combination thereof. Preferably, the base portion 204 is attached to the lens portion 214 at the lower extremity of the lens portion 214. Directed into and/or disposed within the lens portion is an electrically powered light source 203, preferably at least one light emitting diode (LED). The LED 203 is preferably supported by the base 204. Connected to the LED 204 in the base portion 204 via conductive elements 205 is a remote power supply unit 206.

Alternatively or additionally, the phosphorescent material 202 may be coated with a light transmissive waterproof coating. Preferably, the LED 203 emits at least some ultraviolet light within the lens portion 214. Electric current is connected to the LED 203, causing the LED 203 to emit ultraviolet light to strike the phosphorescent material 202, and therefore the phosphorescent material is caused to emit visible light. Further, the inside space of the lens portion may be an empty space. Thus there is an illuminated fixture comprising an LED 203 located proximate to a light transmissive lens portion 214 whereby the lens portion 214 is illuminated from within by the LED 203.

This is achieved because a substantial percentage of the light emitted by the LED is in the ultraviolet light spectrum so that the LED emits at least some light in the blacklight ultraviolet wavelength spectrum.

At least some part of said lens portion 214 exhibits fluorescence when excited by said LED 203 and exhibits phosphorescence by emission of light by a luminescent element 202 after excitation by the LED 203 has ceased. The provision of the ultraviolet (UV) emitting LED 203 proximate to the phosphor 202 assures that upon activation of the LED 203, the phosphor 202 is excited and continues to phosphoresce after the LED 203 has been deactivated.

Regardless of the application method, once the phosphorescent material 202 is proximate to the surface of the lens portion 214, the LED 203 directed into or located within the lens portion 214 affords a highly efficient excitation of the phosphor 202 resulting in efficient phosphorescent emission. An LED 203 operative in the present invention preferably emits some either UV-A light corresponding to between 315 nanometers (nm) and 405 nm wavelength or UV-B light corresponding to between 280 nm and 320 nm wave length. The operative LED 203 herein may include gallium indium nitride and gallium nitride. Preferably, the light source 203 is oriented to direct a majority of the emission there from into and outward through the lens portion 214.

Figure 16:
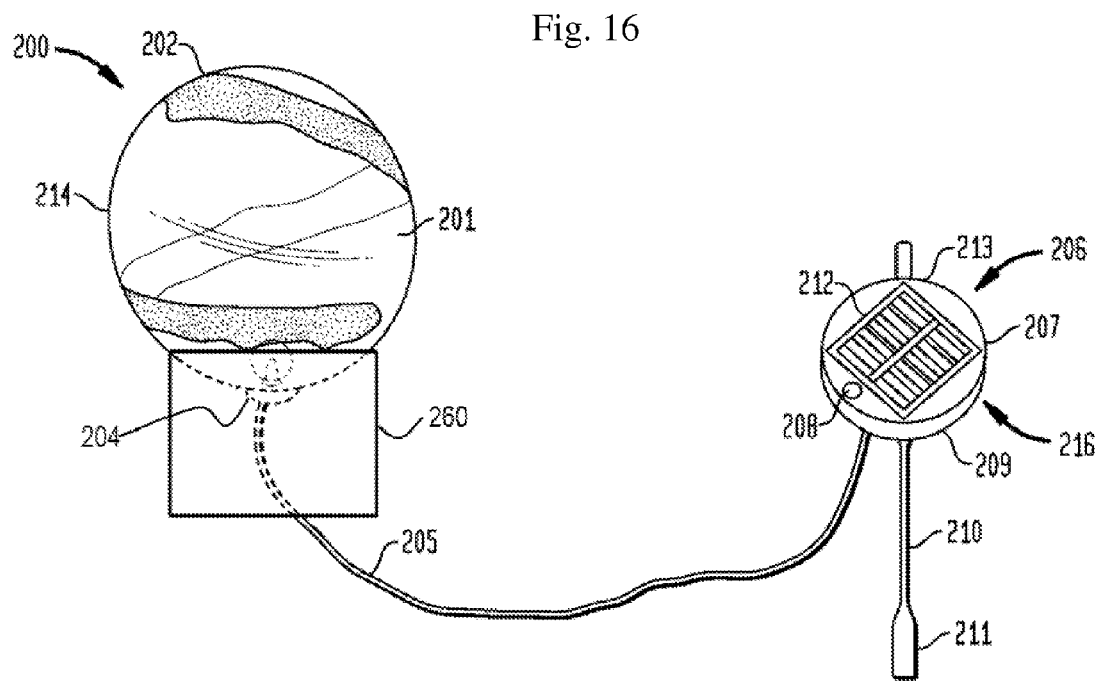
FIG. 16 is a diagrammatic view of the embodiment of FIG. 10 with a block diagram representation of a metal frame.

The conductive elements 205 are preferably releasably connected to either or both of the base 204 or the remote power supply unit 206. A plug and socket arrangement facilitates the connection and release of the conductive elements 205 with the base 204 and/or the remote power supply unit 206. The lens portion 214 is usually installed in a stone or polyresin pedestal base or metal frame that is sold separately. FIG. 16 is a diagrammatic view of an in situ installation of the invention showing a block diagram form representation of a metal frame 260. In FIG. 16, the metal frame 260 supports the lens portion 214 with the base 204 protruding below the frame 260 allowing space for the conductive elements 205 to be located within the vertical confines of the frame 260 area. The releasable cabling arrangement facilitates installation of the lens portion 214 with the base portion 204 in such a pedestal base or metal frame 260. The present invention can be used to replace existing "gazing globe" installations.

In FIG. 10, the power supply unit 206 has a housing 207 that is preferably made from two upper and lower plastic parts mated together. The two housing 207 parts are preferably connected together using stainless steel screws. Also disposed within the lower portion of the housing 207 is a battery access panel to access batteries 209.

Disposed upon the surface of the power supply unit 206 are several photovoltaic panels 212 that in the present embodiment are of a crystalline silicon structure. Preferably the solar panels are assembled using a lamination process as opposed to an epoxy encapsulation process. As an alternative, one or more amorphous silicon type solar panels may be used. Disposed within the power supply unit 206 is a rechargeable power source which is recharged by the solar panels 212. In this embodiment the rechargeable power source is in the form of two AA size 600 mA/hour nickel cadmium batteries 209 (not shown). Alternatively, other rechargeable power sources may be used including one or more nickel metal hydride batteries, rechargeable alkaline batteries, lead acid batteries, lithion ion batteries or similar. Access to the batteries for replacement is through a user accessible battery compartment (not shown) located on the underside of the power supply unit 206. A power supply circuit connects the solar panels 212 in series to a forward based diode, which is in turn connected to a positive terminal of at least one battery 209. A negative terminal of the battery 209 is then connected to the solar panel 212 to complete a power supply circuit. In this example the diode may be a model number IN5817 Schottky diode. It will be apparent to a person skilled in the art that other diode and battery configurations may be utilized without departing from the spirit and scope of the invention. When the solar panel 212 is exposed to sufficient light, the solar panel 212 converts some of the solar energy to electrical energy and creates a current that passes through the diode to charge the battery 209. Thus, during the day the solar panel 212 converts energy from the sun to charge the battery 209. The diode prevents the battery 209 from expending any power on the solar panel 212.

Attached to the power supply unit 206 is a pole 210 attached to a ground stake 211 for affixing the power supply unit 206 in an upright position into a ground surface. The length of the pole 210 is preferably of sufficient height to raise the power supply unit 206 above the height of pooled water during rain. The length of the pole 210 is may also be of sufficient height to raise the power supply unit 206 above surrounding ground shrubbery to ensure the solar panel 212 is exposed to sunlight.

The housing 207 is preferably attached to the pole 210 with a user operable hinge 213 (not shown) that allows the angle of the housing 207 relative to the pole 210 to be adjusted parallel to the pole 210. The angle of the housing 207 is adjusted at the time of packaging to facilitate slimmer packaging and then adjusted by the user at the time of installation to face the midday sun to ensure the photovoltaic cells 212 receive the maximum solar energy. In higher latitudes this angle increases from the horizontal as the installation location is located towards the north and south pole.

Also located within the power supply unit 206 is a control unit 216 (not shown) which may be arranged to sense the ambient light level, for example, in the present example, a light dependent cadmium sulfide resistor 208 located in a light exposed location on the power supply unit 206, and if a determination is made by the circuit that insufficient ambient light is available, a connection is made between the batteries 209 and the light source 203. If a determination is made that sufficient ambient light is available, a connection is not made between the batteries 209 and the light source 203 and current does not flow from the batteries. Specifically, the positive terminal of the battery 209 is connected to a switch (not shown), which is in turn connected to a 100 k.OMEGA. first resistor (not shown). The first resistor is connected in series with a second, light dependent resistor 208. The second resistor 208 connects to the negative terminal of the batteries 209 to complete the lighting circuit. The value of resistance of the second resistor 208 depends upon the amount of light to which the second resistor 208 is exposed. When there is not much light, such as occurs at night, the value of the second resistor 208 increases. During the daytime, when there is sufficient light, the value of the second resistor 208 decreases. Accordingly, the resistor 208 allows the lighting circuit to operate only when there is insufficient light, i.e. at night.

Preferably the lens portion 214 is electrically illuminated for at least six hours.

The control unit 216 may serve to automatically vary the brightness of the LED 203. Optionally, the cycle includes a period of no emission to allow for isolated visible phosphorescence emission. When multiple light sources 203 are present, it is appreciated that two or more light sources having different emission characteristics can be controlled to afford different illumination levels and therefore a varying color emission.

Further, the control unit 216 may selectively activate the LED 203 in a time pulsed manner. Preferably, when the light source 203 is a UV LED, the UV LED is activated in a time pulsed manner by the controller 216 consistent with the decay time of the phosphor pigment.

The light device 200 may also be arranged to receive power directly from an external power source, for example by providing the light device 200 with an appropriate step-down transformer (not shown) connectable to mains AC electrical power, and appropriate AC to DC conversion circuitry instead of connection to the remote power supply unit 206. In addition, the light device 200 may be arranged to additionally receive power from an external power source and to use the power to recharge the batteries 209 in the remote power supply unit 206.

The electrical light source 203 may flicker with a candle like appearance. In order to cause the electrical light source 203 to flicker, the control unit 216 may be provided with an inverter (not shown) and the inverter controlled so as to generate an alternating current which causes the electrical light source 203 to mimic the characteristic flicker of a flame. Alternatively, an irregular oscillating input may be applied to a switching transistor so as to cause irregular switching of current through the LED 203. Appropriate biasing signals for the switching transistor may be generated using multiple oscillators, each of which is arranged to oscillate at a different frequency. For example, a base of the switching transistor may be connected to outputs of multiple Schmitt trigger oscillators arranged to oscillate at different frequencies, the Schmitt trigger oscillators for example being constructed using a CMOS40106 Hex inverting Schmitt trigger integrated circuit.

The control unit 216 may be controllable so that the light source 203 is caused to flicker or to not flicker, for example based on the position of a manually operable switch.

The light source 203 may also or instead include a colored light or a light capable of being used to provide varying colors. As the glass in the lens portion 214 is preferably of more than one colored glass, the different colors produced by the light source 203 appropriately illuminate the corresponding colors within the glass of the lens portion 214. The light source 203 may include at least one of a red, green, blue and at least one of an ultraviolet emitting light source such that the fluorescent pigments 202 are excited by the ultraviolet light and the colors in the glass 201 are alternatively illuminated by the changing colors of the spectrum produced by the changing interaction of the different colored light sources. Alternatively there may be at least two different colored light sources 203 instead of three.

Figure 11:
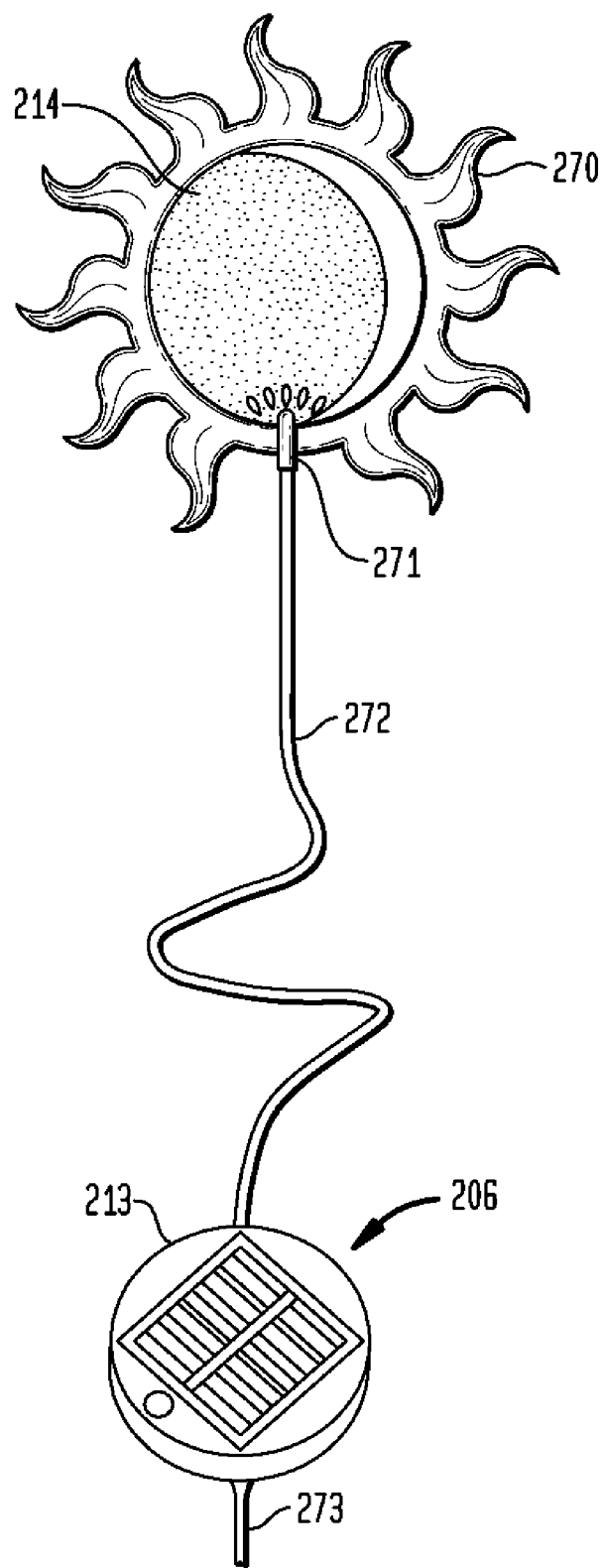
FIG. 11 is a diagrammatic view of a further embodiment of the invention.

FIG. 11 is a diagrammatic view of a further embodiment of the invention.

In the embodiment illustrated in FIG. 11, the illumination functions are the same as in FIG. 10 however, the power supply unit 206 is not remote from the lens portion 214 but is mechanically fixed onto a pole portion which has an upper pole portion 272 above the power supply unit 206 and a lower pole portion 273 below the power supply unit 206. The lower pole portion 273 is affixed into a ground surface. Preferably, the upper pole portion 272 is releasably connected to the lower pole portion 273 to facilitate packaging and transportation. As in the embodiment disclosed in FIG. 10, the power supply unit 206 is similarly hinged to the pole 272 with hinges 213 (not shown).

Conductive elements are disposed within the upper pole portion 272 and carry electrical current from the power supply unit 206 to the light source (not shown) disposed proximate to the lens portion 214 such that light is directed from within the lens portion 214. The lens portion 214 is rigidly fixed on a frame 271 that is connected to the upper pole portion 272.

In this embodiment a surround frame 270 encircles the lens portion 214. The surround frame 270 adds a decorative element but also provides some impact protection for the lens portion 214 should the fixture topple over and fall. The frame may be any decorative shape such as a sun, flower, moon, insect, or geometric shape. The surround frame may partially or fully encircle the lens portion 214 and may surround the lens portion 214 in two or three dimensions. When illuminated, light emanating from the lens portion 214 illuminates at least part of the frame 270 providing nighttime illumination of the decoration.

The pole portions and frame portions are preferably made from metal such as brass, aluminum, iron or steel.

Figure 12:
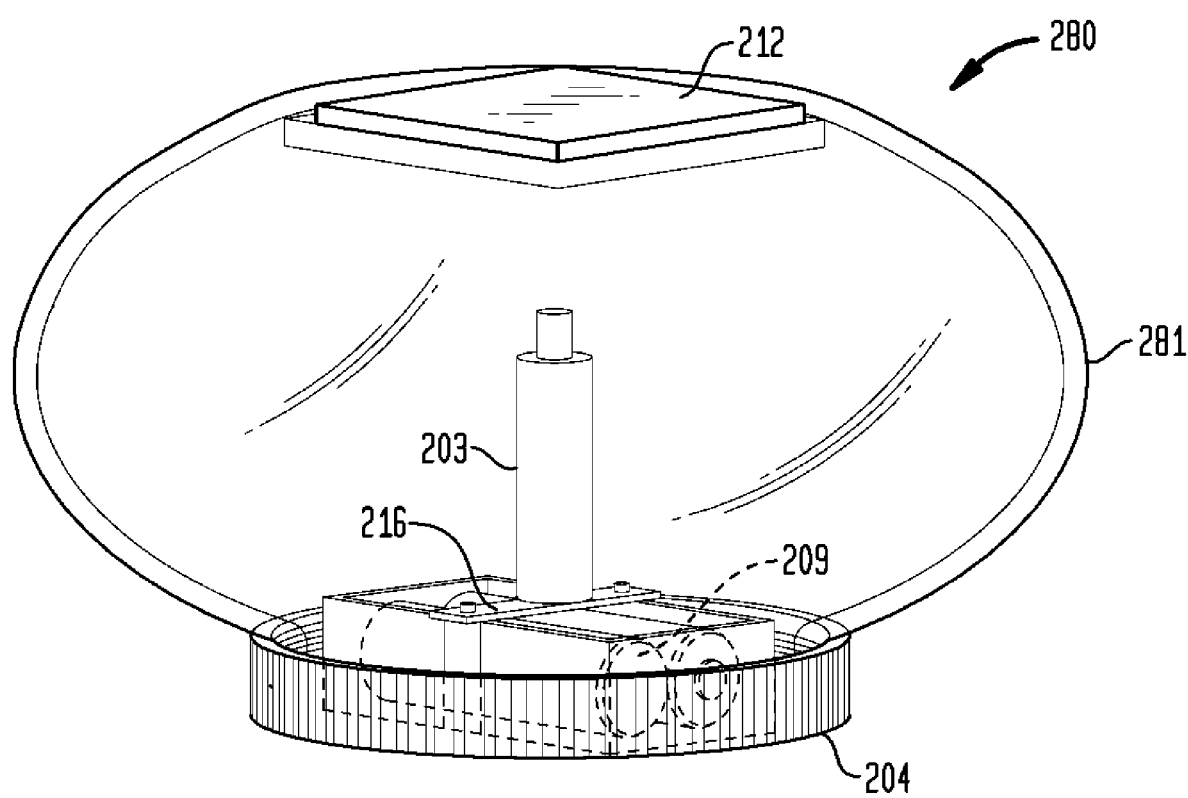
FIG. 12 is a diagrammatic view of a further embodiment of the invention.
Figure 13:
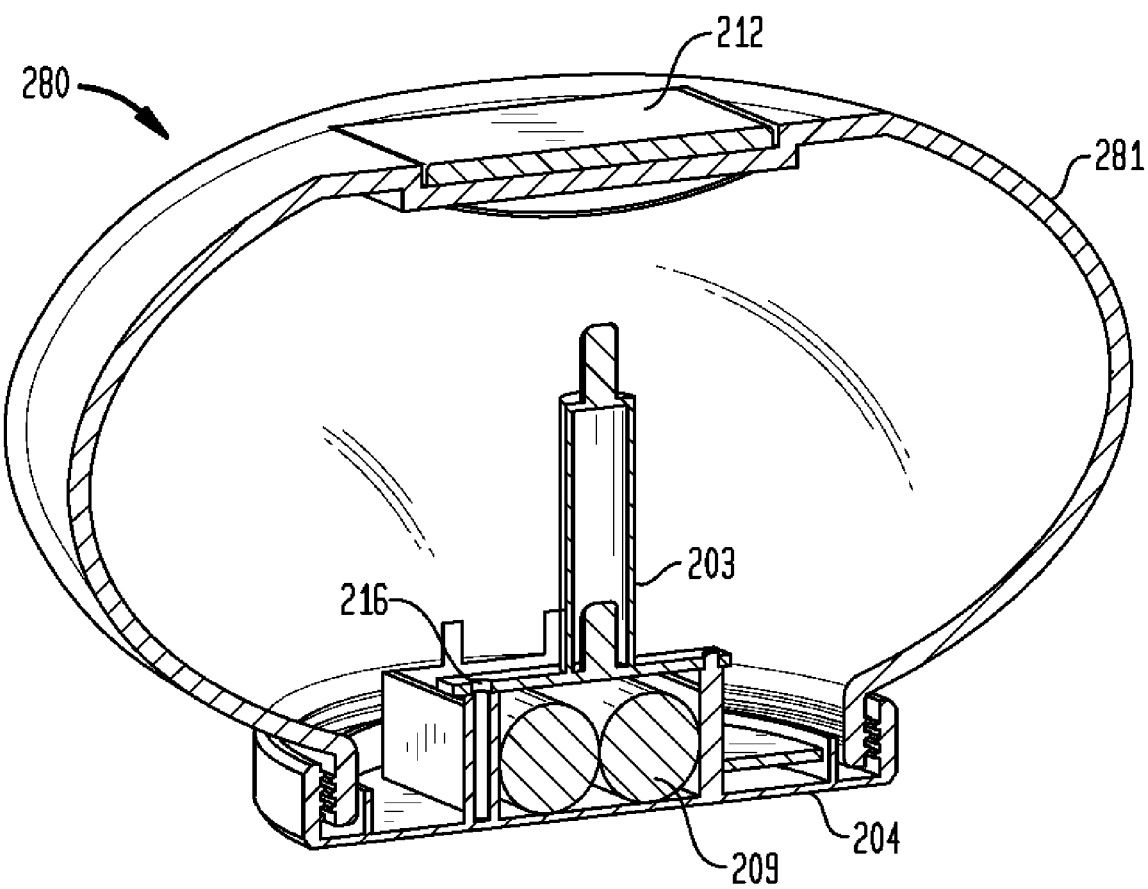
FIG. 13 is a diagrammatic view of a further embodiment of the invention.
Figure 14:
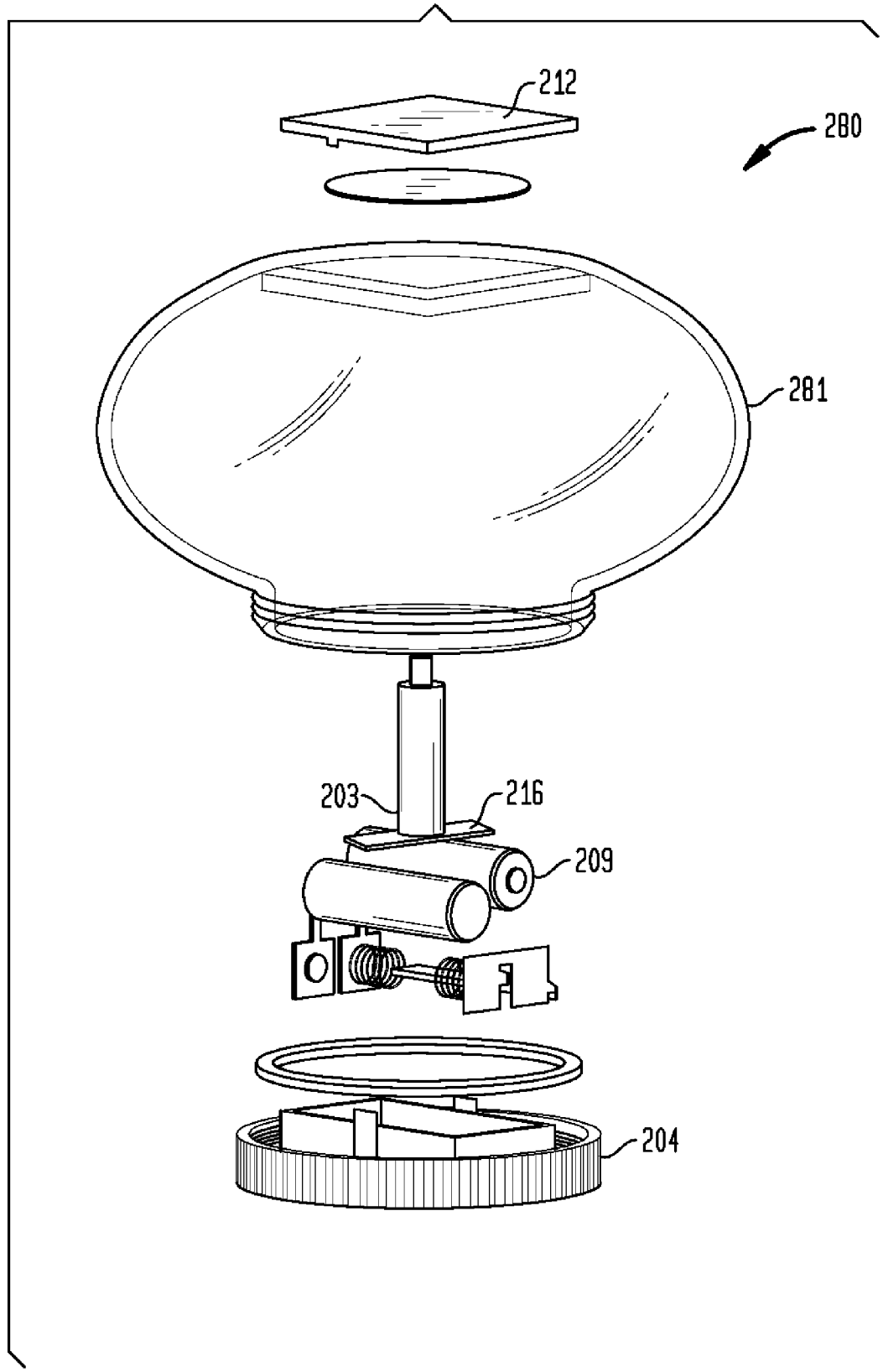
FIG. 14 is a diagrammatic view of a further embodiment of the invention.

FIGS. 12, 13 and 14 are diagrammatic views of a further embodiment of the invention.

In the embodiment illustrated in FIGS. 12, 13 and 14, the illumination functions are the same as in FIGS. 10 and 11 and the lens portions are of the same materials and functions however, the photovoltaic panel 212 is integral with the glass lens portion 281 and is affixed to an upper surface of the lens portion 281 that has a recess constructed into the lens portion 281 to position the solar panel 212 and recess it into the surface of the lens portion. A small hole (not shown) is made in the lens portion 281 beneath the solar panel 212 to allow conductive elements to carry current from the solar panel into the lens portion 281 to a control unit 216 located on an upper portion of the base 204 which is releasably attached to the lens portion. The small hole is airtight and waterproofed around the hole. The seal between the lens portion 281 and the base 209 is preferably waterproof such that the light fixture 280 will float upright in water. Because the light fixture 280 is airtight above the waterline, the air within the light fixture 280 will cause the fixture 280 to float on water when the base 204 is sealed to the lens portion 281. Preferably, the base 204 is affixed to the lens portion 281 with a screw threaded arrangement. A gasket assists in the waterproofing.

Preferably the solar panels 212 are assembled using a lamination process as opposed to an epoxy encapsulation process. As an alternative, one or more amorphous silicon type solar panels may be used. Disposed within the light fixture 280 and affixed to the base 204 is a rechargeable power source which is recharged by the solar panels 212. In this embodiment the rechargeable power source is in the form of two AA size 600 mA/hour nickel cadmium batteries 209. Alternatively, other rechargeable power sources may be used including one or more nickel metal hydride batteries, rechargeable alkaline batteries, lead acid batteries, lithion ion batteries or similar. Access to the batteries for replacement is through a user accessible battery compartment (not shown) located on the underside of the power supply unit 206. A power supply circuit 216 connects the solar panels 212 in series to a forward based diode, which is in turn connected to a positive terminal of at least one battery 209. A negative terminal of the battery 209 is then connected to the solar panel 212 to complete a power supply circuit. In this example the diode may be a model number IN5817 Schottky diode. It will be apparent to a person skilled in the art that other diode and battery configurations may be utilized without departing from the spirit and scope of the invention. When the solar panel 212 is exposed to sufficient light, the solar panel 212 converts some of the solar energy to electrical energy and creates a current that passes through the diode to charge the battery 209. Thus, during the day the solar panel 212 converts energy from the sun to charge the battery 209. The diode prevents the battery 209 from expending any power on the solar panel 212.

The control unit 216 may be arranged to sense the ambient light level, for example, in the present example, a light dependent cadmium sulfide resistor (not shown) located in a light exposed location on the light fixture, and if a determination is made by the circuit that insufficient ambient light is available, a connection is made between the batteries 209 and the light source 203.

Figure 15:
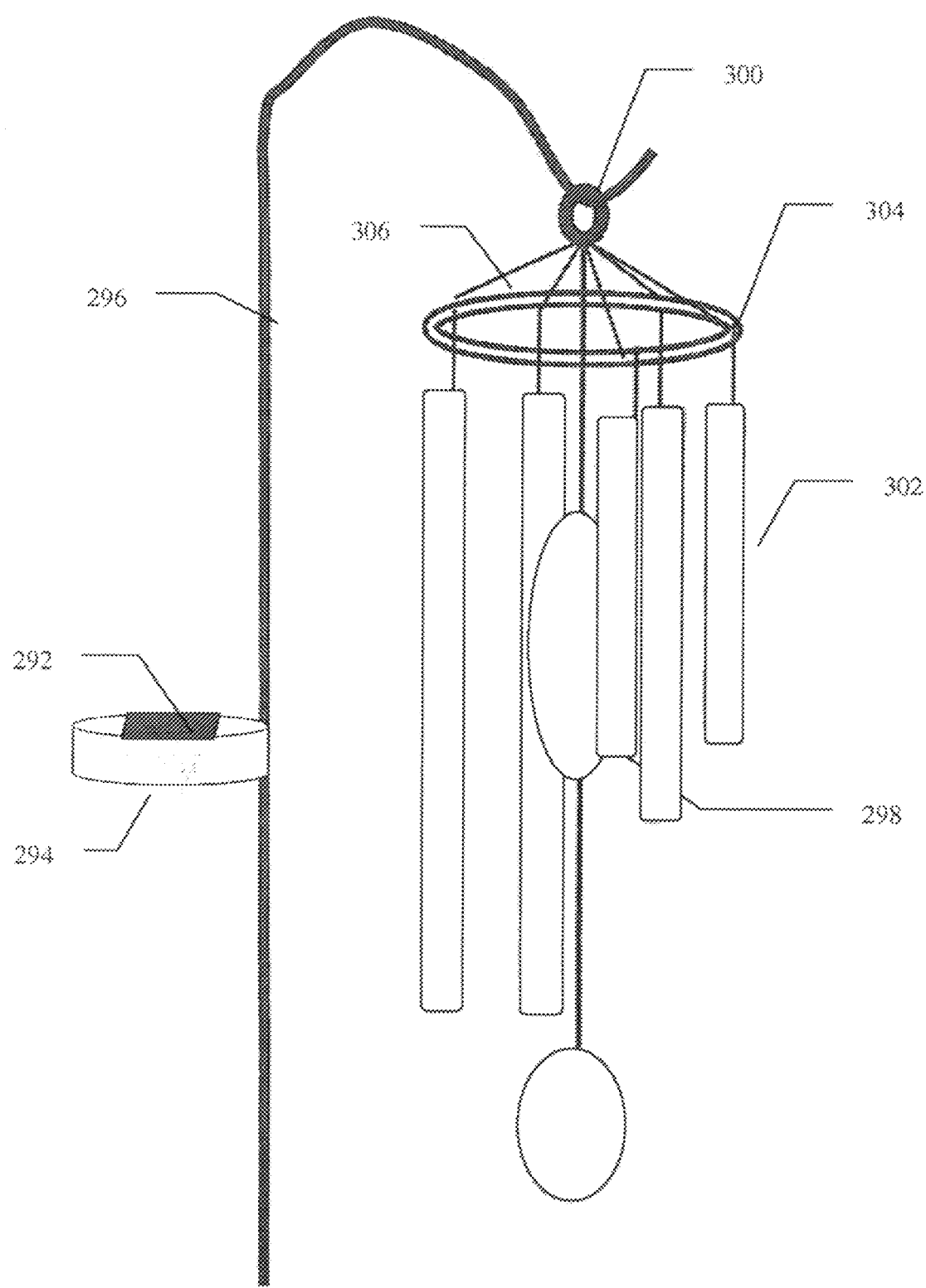
FIG. 15 is a diagrammatic view of a further embodiment of the invention.

FIG. 15 is a diagrammatic view of a further embodiment of the invention. In the illuminated wind indicator 290 of FIG. 15, a solar panel 292 and batteries (not shown) are housed in a components module 294 that may be attached to a hollow, or partially hollow, support 296. The support 296 is shaped so that an illuminated pendulum 298 may be supported by, for instance being attached to a toroidal, or partially toroidal ring 300 that is threaded over the support 296 and allowed to hang from a bend in the support 296. The electrical wiring connecting the components module 294 to the illuminated pendulum 298 may for instance run up inside the support 296 and exit the support at, or in the vicinity of the nadir of the bend from which the illuminated pendulum 298 is suspended. The chimes 302 may, for instance, hang from a chime support ring 304 that may itself be hanging from the toroidal ring 300 by spokes 306 that may themselves be stiff or flexible.

Modifications and variations as would be apparent to a skilled addressee are deemed to be within the scope of the present invention.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A wind indicator, comprising:
   a suspension device;
   at least one chime member, wherein said at least one chime member is movably suspended below said suspension device;
   a pendulum assembly movably suspended from said suspension device such that said pendulum assembly and said at least one chime member move relative to each other;
   at least one light source situated such that a portion of said pendulum assembly emits light;
   at least one rechargeable battery connected so as to provide power to said at least one light source;
   an activation circuit to provide power to said at least one light source from said at least one rechargeable battery at ambient light levels at or below a predetermined intensity;
   at least one solar panel connected such that said at least one rechargeable battery accumulates charge when said at least one solar panel is exposed to ambient light levels of sufficient intensity; and
   wherein at least part of said light emitted by said pendulum assembly is reflected by said at least one chime member causing at least part of an external surface of said at least one chime member to be illuminated such that movement of said at least one chime member relative to said pendulum assembly is visible at said ambient light levels.

2. The wind indicator of claim 1, wherein said at least one chime member is at least two resonating members, and wherein said at least two resonating members are movable by force of wind into contact with at least part of said pendulum assembly causing vibration of said at least two resonating members to produce at least one acoustic sound.

3. The wind indicator of claim 2, wherein at least part of said light emitted by said pendulum assembly is reflected by part of an external surface of said at least two resonating members causing at least part of said external surface to be illuminated such that said movement of said at least two resonating members is visible at low ambient light levels.

4. The wind indicator of claim 3, further comprising:
   An at least partially light-transmissive, partially hollow lens comprising luminescent material and extending to cover at least part of said at least one light source;
   wherein light from said at least one light source causes at least part of said lens to luminesce; and
   wherein said at least one chime member is an at least partly hollow tube member.

5. The wind indicator of claim 3, wherein said pendulum assembly further comprises a striker element adjacent to said at least two resonating members, and wherein said striker element emits light produced by said at least one light source that is positioned proximate to said striker element.

6. The wind indicator of claim 3, wherein said pendulum assembly further comprises a wind catcher element proximate to a lower end of said pendulum assembly, and wherein said wind catcher element emits light produced by said at least one light source that is positioned proximate to said wind catcher element.

7. The wind indicator of claim 3, wherein said suspension device is a substantially vertically-oriented support ring.

8. The wind indicator of claim 3, further comprising:
   a substantially horizontally-oriented suspension ring suspended below said suspension device, wherein said at least two resonating members are laterally spaced apart by said suspension ring;
   a partially hollow support riser connected to said suspension member;
   a ground stake connected to a lower end of said support riser; and
   wherein said at least one solar panel is attached to a substantially vertical portion of said support riser in lateral spaced apart relation to said at least two resonating members.

9. The wind indicator of claim 3, wherein said suspension device is selected from the group consisting of at least one ring, at least one cable, at least one spoke and a housing.

\* \* \* \* \*